Nov. 26, 1940.   L. O. YEOMANS   2,223,146
FLUID DISPENSING APPARATUS
Filed Oct. 7, 1936   9 Sheets-Sheet 4
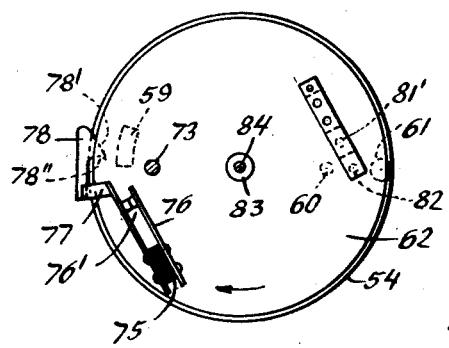
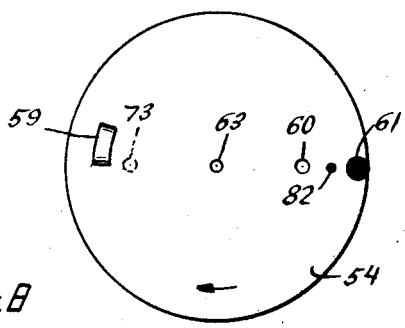
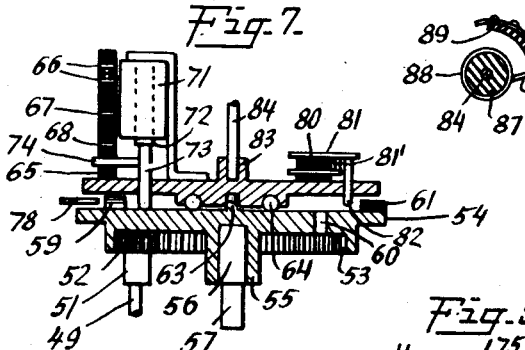
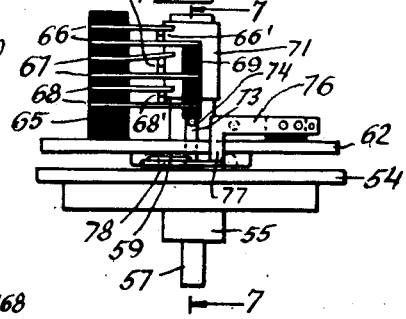
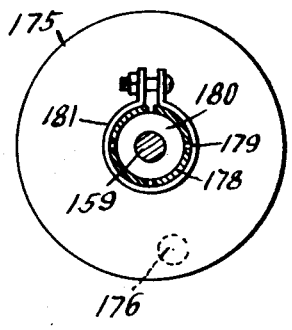
INVENTOR
Lucien O. Yeomans
BY
Rennie Davis Marvin & Edmonds
ATTORNEYS

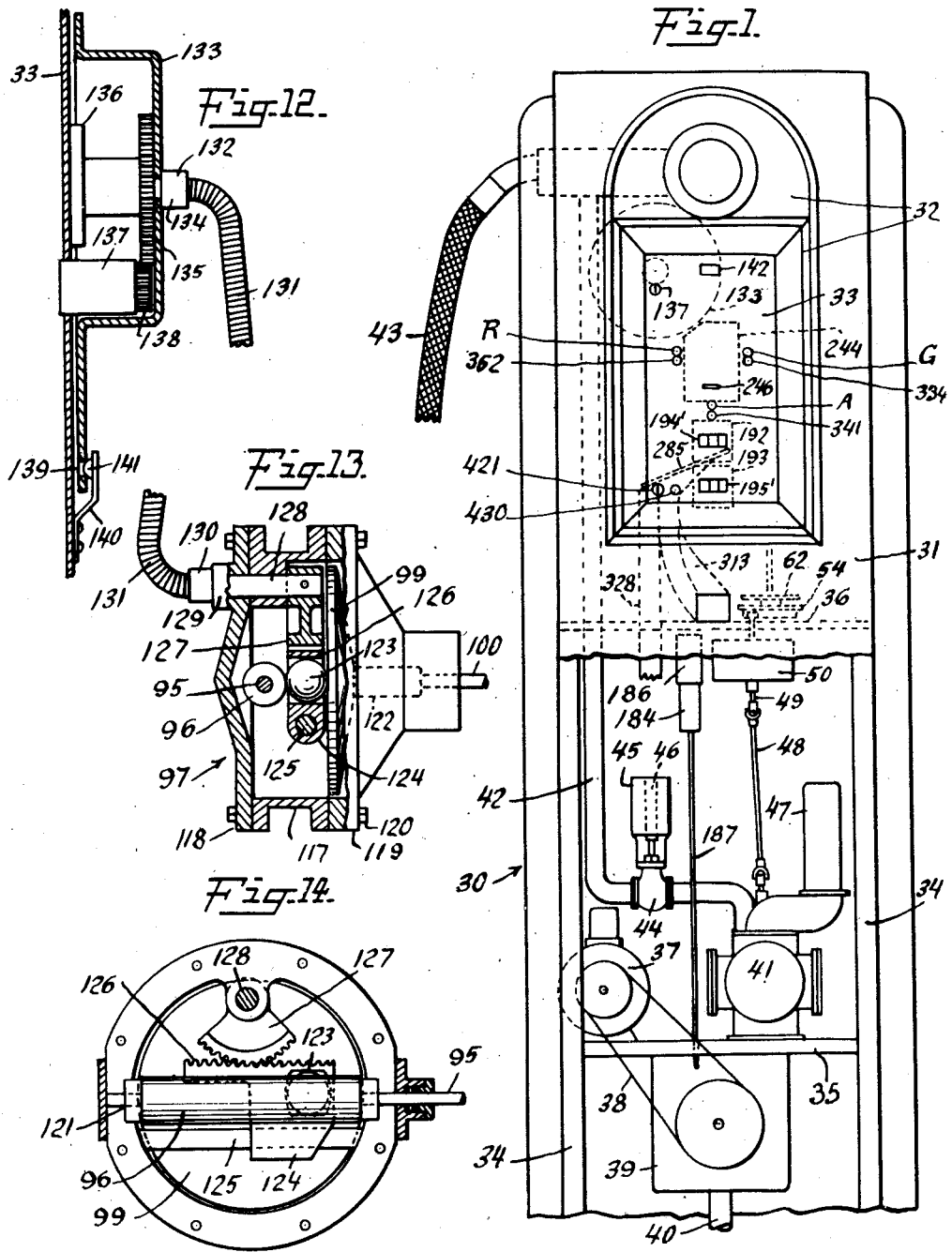

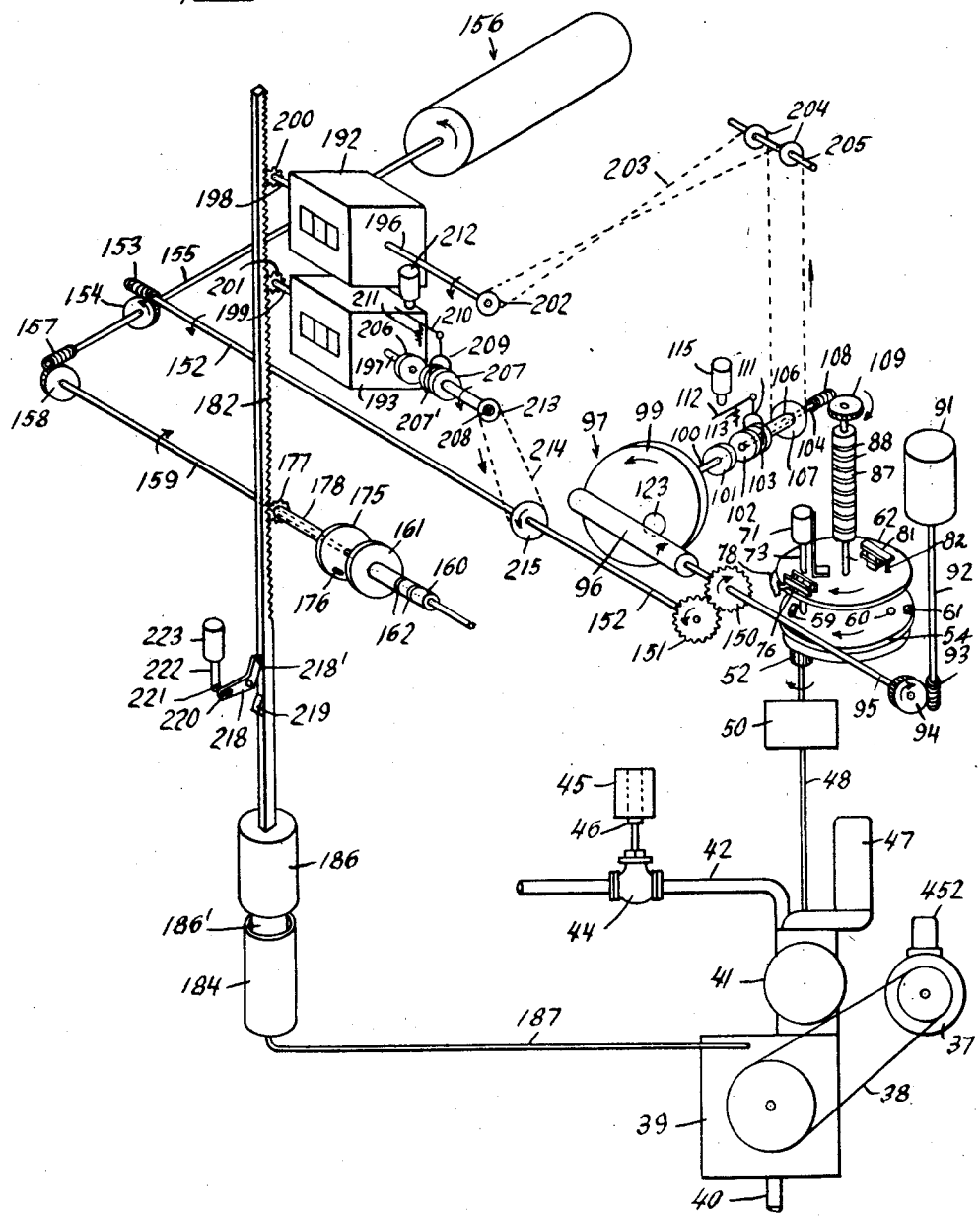

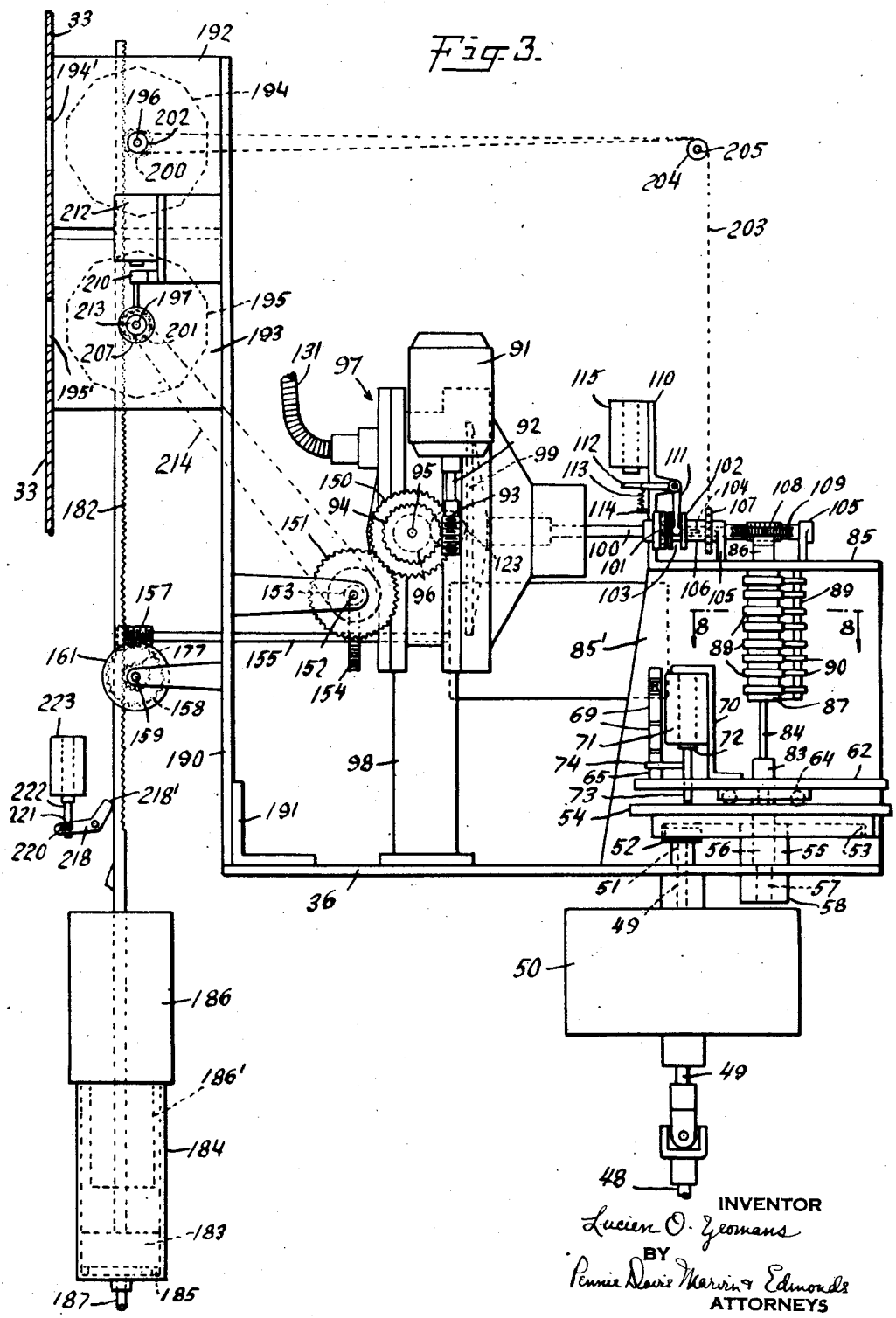

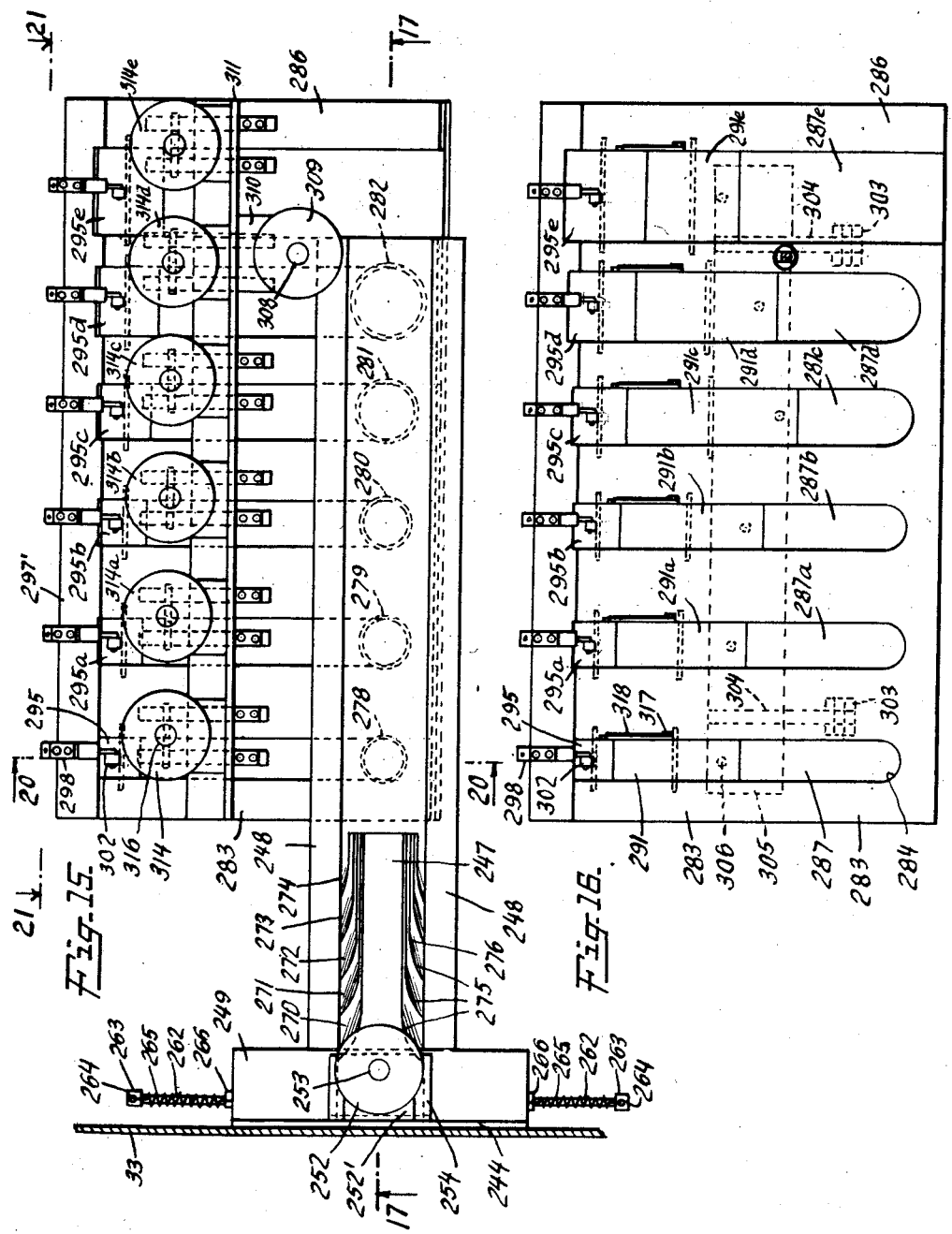

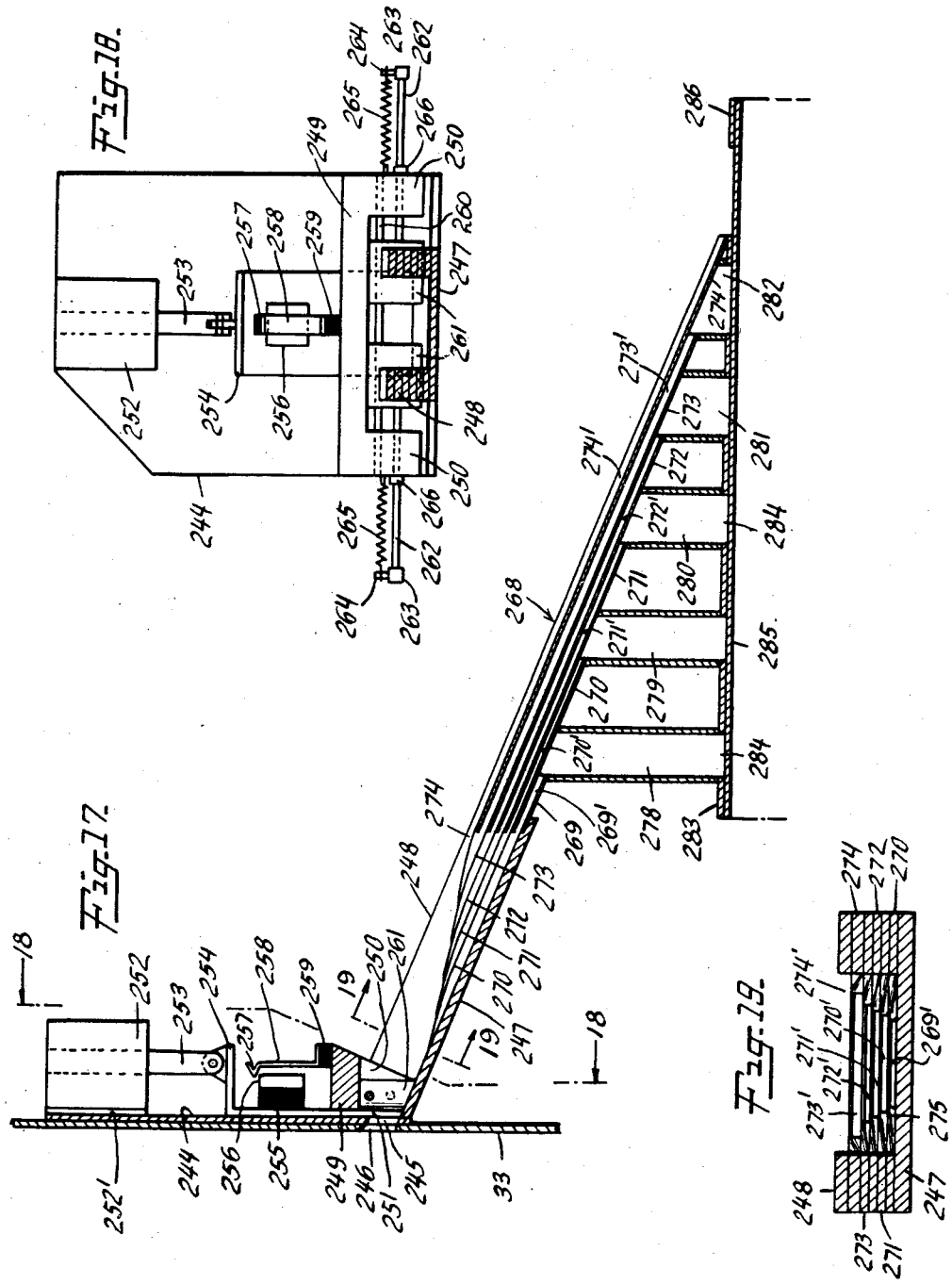

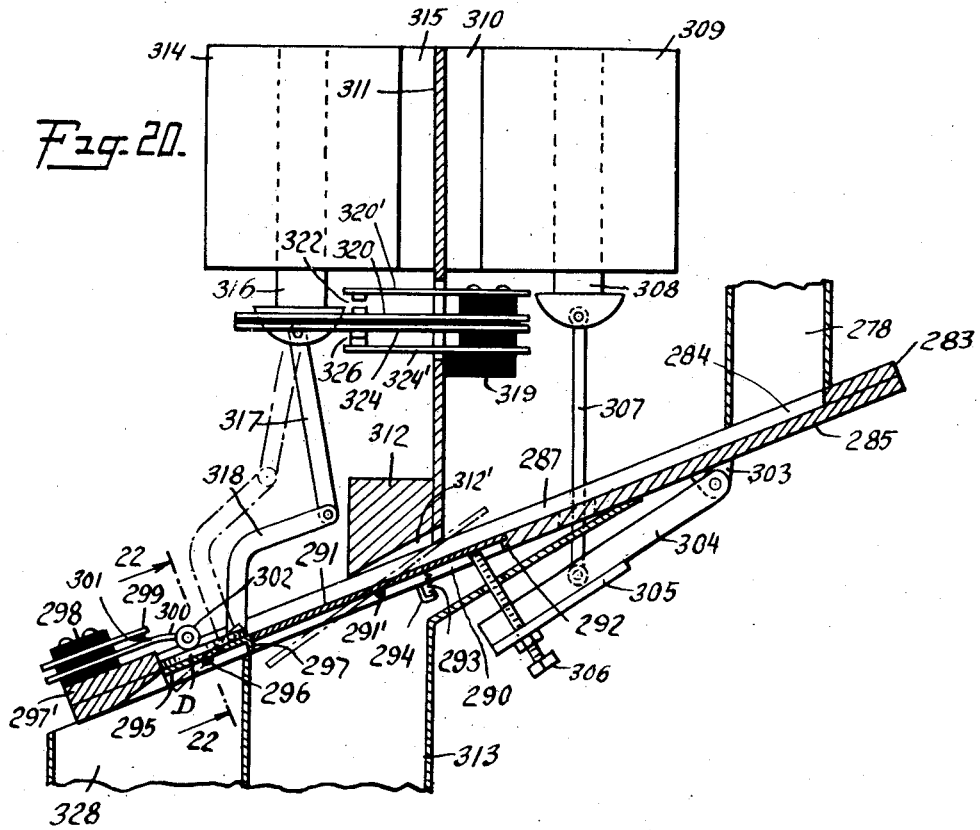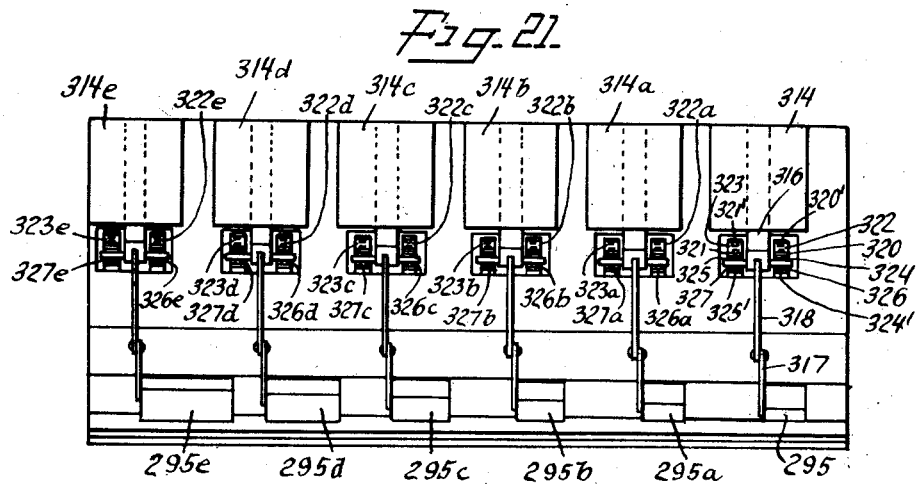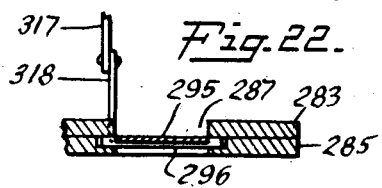

Nov. 26, 1940.    L. O. YEOMANS    2,223,146
FLUID DISPENSING APPARATUS
Filed Oct. 7, 1936    9 Sheets-Sheet 8
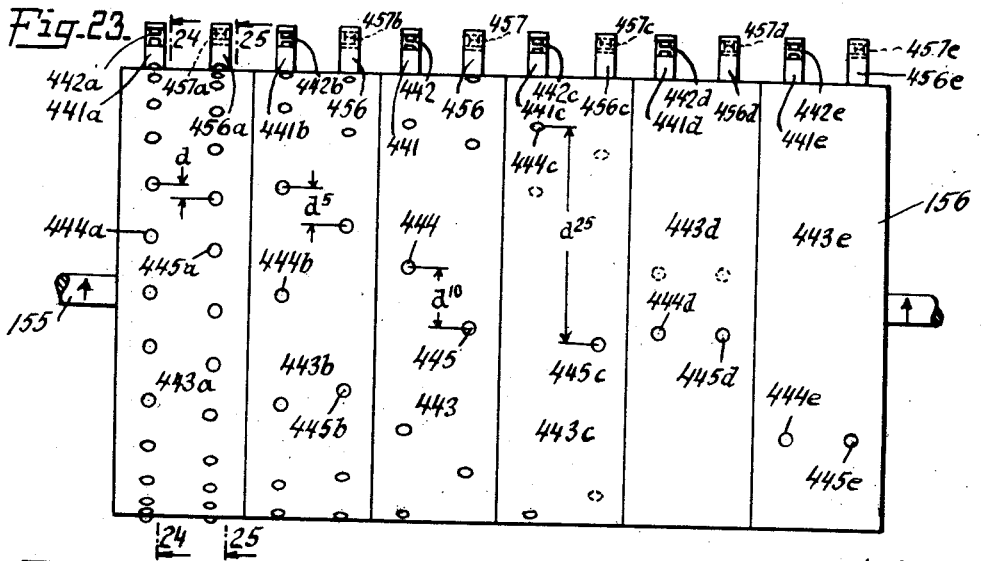
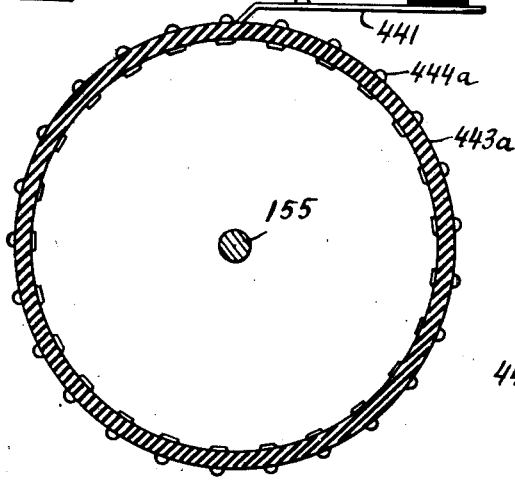
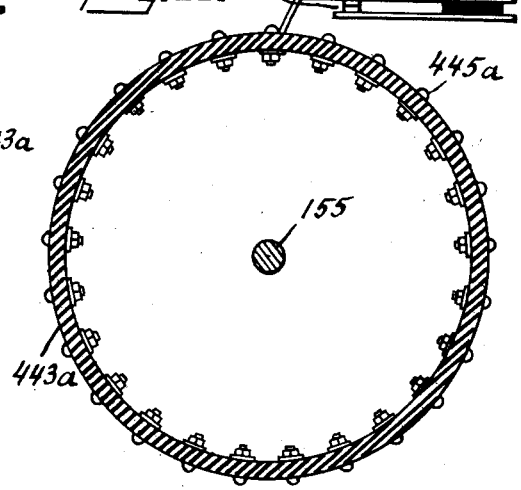
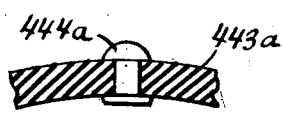
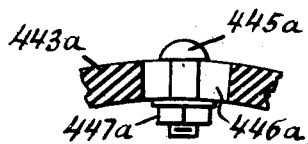
INVENTOR
Lucien O. Yeomans
BY
Pennie Davis Marvin & Edmonds
ATTORNEYS

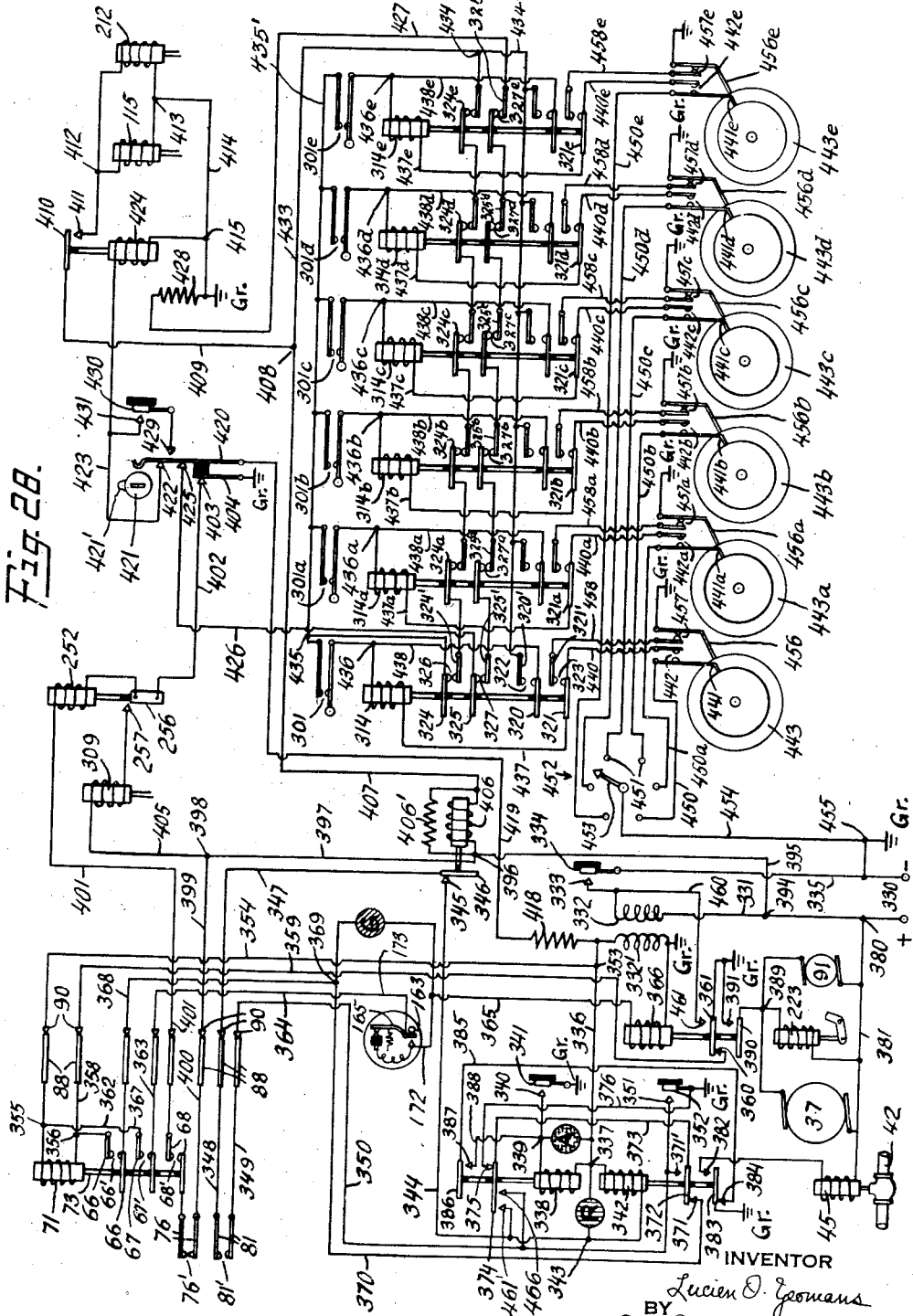

Patented Nov. 26, 1940

2,223,146

UNITED STATES PATENT OFFICE 2,223,146

FLUID DISPENSING APPARATUS

Lucien O. Yeomans, Merrick, N. Y., assignor of seventy-seven and one-half hundredths to William J. Cashman, Asbury Park, N. J.

Application October 7, 1936, Serial No. 104,373

31 Claims. (Cl. 194—13)

This invention relates to fluid dispensing apparatus and more particularly to a novel apparatus of this type which may be preset selectively to deliver any desired quantity of fluid and is operable automatically to shut off the flow of fluid when the desired quantity has been delivered. The new apparatus is accurate and reliable in operation and may be provided with means for indicating automatically in advance of the actual delivery, the amount or the cost, or both, of the fluid which the apparatus is preset to deliver.

One feature of the invention resides in the provision of a novel dispensing apparatus which is operable to deliver a variable preset amount of fluid indicated in terms of cost or volume, or both, by automatic computing means prior to delivery, and which is readily adjustable to vary the operating ratio of the cost and volume computers in accordance with changes in the price of the fluid. An apparatus made in accordance with the invention comprises a fluid delivery means, such as a valve, and a device for metering the fluid passing through the delivery means. The amount of fluid dispensed by the delivery means is determined by a pair of control members which are movable relatively by the metering device. The control members normally assume initial relative positions wherein the delivery means is rendered inoperative, but one of the members may be advanced relative to the other by suitable actuating means through a distance commensurate with the amount of fluid to be delivered, and when this member is so advanced fluid may be dispensed through the delivery means. A cost indicating device is operable by the actuating means for the advancing control member, and a variable speed transmission is disposed between the actuating means and either the advancing control member or the indicating device, whereby the advance of the control member is indicated in terms of cost by the indicating device in accordance with the setting of the transmission. A volume indicator may be operated by the actuating means for the advancing control member, or by the meter which moves the control members relatively to their initial relative positions.

With this construction, when the advancing control member has been preset for the desired amount, the delivery may be started and will continue until the meter returns the control members to their initial relative positions, whereupon the delivery is automatically discontinued. By adjusting the variable speed transmission, the distance through which the advancing control member is preset, and therefore the amount of delivery, for each unit of cost shown on the indicator may be varied to accommodate changes in the selling price of the fluid.

Another feature of the invention resides in the provision of a novel dispensing apparatus which may be operated either by the use of coins inserted in part of the apparatus, or by an attendant without the use of coins. To this end, the apparatus is preferably provided with a lock operable by a key to connect the preset control member to a manually controlled actuating means or to a coin controlled actuating means, as desired.

Still another feature of the invention resides in a novel coin operated mechanism for actuating the preset control member to provide for delivery of a quantity of fluid commensurate with the value of the coins registered by the mechanism. The presetting of the control member is preferably effected by the coin controlled means through an electric motor or other power source which is connected to the preset member through a clutch mechanism. The presetting motor is operated continuously during the coin registering operation but is normally prevented from presetting the rotatable member by reason of the clutch which is normally disengaged. The clutch is operatively connected to the coin registering mechanism, and the latter operates in response to the action of each coin in a set of coin storage chutes to engage the clutch while the presettor motor rotates the driving member of the clutch a predetermined amount depending on the value of the initiating coin, and thereby presets the rotatable control member through a certain angle.

In the preferred form of my invention, the coin registering mechanism includes a plurality of electrical circuits, one for each coin denomination, each of which is prepared but not closed in response to the presence of a coin in its corresponding storage chute. The final closing of the respective circuits is effected at random by means of a selector or distributor which rapidly contacts the several circuits in sequence. When the selector finds a prepared circuit, the circuit is immediately completed and initiates the operation of a timing mechanism, at the same time closing the presettor clutch by means of a solenoid. A separate timing mechanism is provided for each circuit and is adapted to maintain the circuit closed for a time interval commensurate with the value of the coin represented by the circuit. At the end of the time interval the circuit is broken thereby disengaging the presettor clutch, and the mechanism is ready to register another coin. After the distributor has selected a prepared circuit, the coin which prepared the circuit is automatically removed to a storage box so that another coin may take its place. Means are provided for opening the other circuits while any given circuit is in operation, so that the selector may not select another circuit until one circuit has completed its operation. Thus, the presettor clutch is successively engaged in response to the action of the coins in the storage chutes, until all the coins have been registered, thereby presetting the rotatable member through an angle commensurate with the aggregate value of the coins inserted for the transaction.

In order to facilitate the operation of the machine by the customer, I prefer to provide, in the case of a gasoline vending machine, three operating buttons and means for recording their operation, such as electric lights. The first button prepares the machine for the reception of coins by starting the presettor and pump motors and the registering mechanism. The second button starts the delivery of gasoline after the presetting operation by opening the hose discharge valve and the third button is a safety feature which permits the customer to close the hose valve before the full amount of gasoline is delivered. The latter buttons are arranged to allow the customer to alternately open and close the hose discharge valve until the proper amount of gasoline, as determined by the presetting of the delivery control member, is discharged. An electric bulb individual to each button may be arranged to light when the operation is successfully initiated by the button and thereby indicate which operation is in progress. Preferably, means are provided for rendering the gasoline delivery button inoperative while the coin registering mechanism is operating, and also for preventing the insertion of a coin in the machine at any other than the proper part of the transaction cycle.

If desired, the presettor or delivery control member may be arranged to permit delivery of gasoline only when it has been preset more than a certain minimum amount, thereby insuring against transactions involving less than a desired minimum amount of money. Also, the presettor may be arranged to return all coins after the registering of coins aggregating a certain value representing the maximum capacity of the machine for a single transaction, as determined by the greatest amount which the delivery control member can be preset. When the proper amount of gasoline has been delivered, that is, when the rotatable member operated by the discharge volumeter has caught up with its cooperating preset member, the presettor operates through suitable means to stop the pump and presettor motors and the coin registering mechanism. However, a time controlled mechanism is preferably provided for automatically stopping the machine after a predetermined time interval to prevent the machine from running continuously in the event that the customer does not complete the transaction by taking the allotted amount of gasoline.

It will be observed from the foregoing that the new machine is entirely automatic except for a few simple operations which the customer performs, and that the possibility of improper operation of the machine by the customer is eliminated so that the machine is substantially foolproof. At the conclusion of each transaction the gasoline measuring and delivery mechanisms are ready for a new transaction, and it is not necessary for all the parts thereof to be returned to an initial position after each operation. The coin registering mechanism is accurate and of simple construction and may be operated at high speed to register the coins in a short time so that a transaction may be completed substantially as quickly as with an attendant operated pump.

For a more complete understanding of the invention, reference may be had to the accompanying drawings, in which Fig. 1 is a front view of one form of the new apparatus with part of the casing removed;

Fig. 2 is a view in perspective of parts of the apparatus shown in Fig. 1;

Fig. 3 is a side view of the apparatus shown in Figs. 1 and 2 with the casing removed;

Fig. 4 is a plan view of the preset member of the delivery control mechanism;

Fig. 5 is a plan view of the member which cooperates with the preset member of the delivery control mechanism;

Fig. 6 is a side view of the two cooperating rotatable members shown in Figs. 4 and 5 comprising the delivery control mechanism;

Fig. 7 is a section on line 7—7 of Fig. 6;

Fig. 8 is a section on the line 8—8 of Fig. 3;

Fig. 9 is a section through the time controlled mechanism, which functions to stop the apparatus;

Fig. 10 is a section on the line 10—10 of Fig. 9;

Fig. 11 is a plan view of part of the mechanism shown in Fig. 9;

Fig. 12 is a section through the regulating device for the variable speed transmission;

Fig. 13 is a view partly in section of the variable speed transmission;

Fig. 14 is a front view of the variable speed transmission with the cover removed;

Fig. 15 is a plan view of the coin storting device and the coin storage chutes;

Fig. 16 is a true plan view of the coin storage chutes shown in Fig. 15;

Fig. 17 is a section on the line 17—17 of Fig. 15 looking in the direction of the arrows;

Figs. 18 and 19 are sections on the lines 18—18 and 19—19, respectively, of Fig. 17;

Fig. 20 is a section on the line 20—20 of Fig. 15;

Fig. 21 is a section on the line 21—21 of Fig. 15 looking in the direction of the arrows;

Fig. 22 is a section on the line 22—22 of Fig. 20;

Fig. 23 is a top view of the metering drum of the coin registering mechanism;

Figs. 24 and 25 are sections on the lines 24—24 and 25—25, respectively, of Fig. 23;

Fig. 26 is a detail view of one of the contacts of the coin metering drum;

Fig. 27 is a similar view of an adjustable contact employed on the coin metering drum; and Fig. 28 is a schematic diagram of a wiring circuit which may be employed in the new machine.

Referring to the drawings, the numeral 30 (Fig. 1) indicates a casing in which the parts of the apparatus are disposed. The front of the casing comprises a main panel 31 which is formed near the top with an inset portion 32 surrounding a sub-panel 33 for accommodating the cyclometers and other indicators. An upright standard 34 in each corner of the casing is secured to a suitable base (not shown) and the several standards serve as a frame for supporting the sides and top of the casing. Secured to the standards in spaced relation are two horizontal supporting members 35 and 36, and mounted on the lower horizontal member 35 is an electric motor 37 which is connected by means of a belt 38 to a pump 39. The latter is fastened to the lower face of member 35 and is provided with an inlet pipe 40 leading down to a gasoline storage tank (not shown). The discharge end of the pump is connected through a volumeter 41 to a discharge pipe 42 which leads to the top of the casing where it is connected to a hose 43. A discharge valve 44 governs the flow of gasoline through the discharge pipe 42 and the hose. The discharge valve is controlled by a solenoid 45 having a plunger 46 which is operatively connected to the valve. The pump is preferably of the recirculating type in which the charge is recirculated into the storage tank through a relief valve (not shown) during the time that the discharge end of the pump is closed. An air separator 47 is connected to the discharge end of the pump through the volumeter 41.

*Discharge control mechanism*

The indicating member of the volumeter 41 is operatively connected to one end of a shaft 48, the other end of which is connected to the operating shaft 49 of a counting device 50 suitably secured to the frame of the machine (Figs. 3 and 7). The counter 50 serves to record the total number of gallons discharged by the pump, that is, to give an indication of the number of gallons discharged for all transactions as distinguished from the number discharged for each transaction. Shaft 49 extends through the counting device and the horizontal member 36 and is engaged near its upper end in a bushing 51 secured to member 36. A pinion 52 is mounted on the upper end of shaft 49 and meshes with an internal gear 53 which is integral with a disc 54 forming a part of the delivery control mechanism. The latter is provided with a central boss 55 which receives a shaft 56 on which the disc is rotatably mounted. The shaft 56 is formed with a reduced portion 57 and this portion extends through the horizontal member 36 and has a collar 58 on its lower end engaging member 36 to secure the shaft against displacement.

It will be observed that when the pump 39 discharges gasoline through delivery valve 44, the gasoline will drive the volumeter 41 and the latter in turn will rotate disc 54 in a clockwise direction, as shown in Fig. 5, through an angle commensurate with the quantity of gasoline discharged. A cam 59 is secured to the top of disc 54 and has a face which inclines sharply downwardly in the direction opposite to the direction of rotation of the disc (Fig. 5) and relatively gradually downwardly in the direction of rotation of the disc. The face of the cam intermediate the sloping portions is of a uniform height. Also, the disc is provided with an opening 60, and on the same radius as the opening an insulated pin 61 is secured to the top of the disc near the outer edge thereof.

A second disc 62 of the control mechanism is rotatably mounted on disc 54 in spaced relation therewith. The disc 62 is provided with a central opening which receives a centrally disposed pedestal 63 integral with disc 54. A set of antifriction balls 64 is arranged in the lower face of disc 62 and serves to support the latter disc on the upper face of disc 54. Mounted on the top of the upper disc 62 is an upright member 65 made of a suitable insulating material and having three pairs of spring metal contact arms 66, 67 and 68, respectively, embedded therein. The contact arms 66, 67 and 68 extend outwardly from the member 65 and are provided with cooperating contacts 66', 67' and 68', respectively. The lower arm of each pair of contact arms is longer than the upper arm, and the three lower arms of the pairs are connected together at their outer ends by an insulated member 69 which terminates below the lower arm of contact arms 68. The spring effect in the lower arms of the pairs of contact arms 66, 67 and 68 normally holds member 69 in a depressed position and maintains the respective contacts 65', 66' and 67' normally open.

A bracket 70 is mounted on the top of the upper disc 62 near the upright member 65. A solenoid 71 having a plunger 72 is supported on the bracket. The plunger 72 is provided with an extension in the form of a pin 73 which extends downwardly through an opening in the disc 62. The plunger 72 and the opening in the disc 62 through which its pin 73 projects are so positioned that the pin may drop into the opening 60 in disc 54 when the two discs occupy a certain relative position. When the machine is not operating, the solenoid 71 is deenergized and pin 73 is in its lowermost position where it extends into the opening 60. Thus, the pin 73 may occupy any one of three positions, namely, its lowermost position in which it extends into hole 60, its uppermost position in which it is held when the solenoid 71 is energized, and an intermediate position in which it rests on the top of the lower disc when the solenoid is deenergized and the hole 60 is out of alignment with the pin.

An arm 74 extends outwardly from pin 73 and engages the bottom of the insulating member 69, so that when solenoid 71 is energized and raises its plunger 72, the arm 74 raises member 69 and the lower arm of each pair of contact arms, thus closing the contacts 66', 67' and 68'. The contact arms 66, 67 and 68 are arranged so that when pin 73 is in its intermediate position, that is, when it is resting on the top of the disc, contacts 66' and 68' will be open and contacts 67' will be closed.

An insulating post 75 is secured on the top of the upper disc and carries a pair of contact arms 76 provided with normally closed contacts 76'. One of the contact arms 76 has an extension in the form of a latch 77 (Figs. 4 and 6) which extends over the edge of the upper disc and is provided at its end with a projection 78 having a cam edge 78' and a curved inner edge 78''. The projection 78 extends inwardly into the space between the two discs and when the discs are locked together by pin 73 the curved inner edge 78'' of the projection engages pin 61 on the lower disc. When the upper disc is rotated substantially a complete revolution relative to the lower disc, the cam edge 78' of projection 78 engages pin 61, thus causing contacts 76' to open. Also mounted on top of the upper disc 62 is an insulating member 80 carrying a pair of contact arms 81 which are provided with normally closed contacts 81'. The upper contact arm 81 is longer than the lower arm and carries at its end a pin 82 which extends through a hole in the upper disc. When the two discs are locked together by pin 73, contacts 81' are closed, but due to the contour of cam 59 on disc 54, the slightest angular displacement of disc 62 in a clockwise direction (Fig. 4)

relative to disc 54 will serve to open contacts 81', and the latter will remain open as long as pin 82 is under the influence of cam 59. The purpose of contacts 76' and 81' will be described presently.

The top of the upper disc 62 is formed with a central boss 83 in which one end of a shaft 84 is fixed (Fig. 3). The other end of the shaft extends through a supporting plate 85 mounted on an upright 85' connected to horizontal member 36 and is engaged in a bushing 86 secured to the supporting plate. An insulating drum 87 is mounted on the intermediate portion of shaft 84 and this drum is provided with commutator rings 88 which rotate with the drum and the upper disc. Wires lead from various contacts carried by the upper disc to these rings, as will be described presently. A plate 89 of insulating material extends downwardly from plate 85 and carries brushes 90 engaging the commutator rings.

The shaft 84 is adapted to be rotated by an electric motor 91 (Fig. 2) to preset or advance the upper disc 62 relative to the lower disc. The motor 91 is suitably mounted in the casing 30 and is provided with a drive shaft 92 on the end of which is a worm 93 engaging a worm gear 94 mounted on the end of a shaft 95. The latter shaft is supported in bearings (not shown) and is connected to the driving member 96 of a variable speed transmission 97 (Figs. 3, 13 and 14) which is supported on a standard 98 mounted on the horizontal member 36. The variable speed transmission 97 will be referred to in greater detail presently. The driven member 99 of the variable speed transmission is connected to a shaft 100 on the end of which is the driving member 101 of a friction clutch. The driven member 102 of the friction clutch is in the form of a collar having a circumferential groove 103 therein, and is splined on a shaft 104. This shaft is supported in bearings on a pair of spaced brackets 105 mounted on the supporting plate 85. The collar 102 is movable longitudinally on shaft 104 and is provided with an extension sleeve 106 surrounding the shaft and on the end of which a sprocket wheel 107 is fixed. Mounted on shaft 104 near the end thereof is a worm 108 (Fig. 2) which engages and is adapted to drive a worm wheel 109 keyed on the upper end of shaft 84. A bracket 110 extends upwardly from the supporting plate 85 and pivoted thereon is a yoke 111 the end of which is engaged in the groove 103 of clutch member 102. An arm 112 extends at right angles to the yoke from the pivoted end thereof and is connected to one end of a spring 113, the other of which is secured to a pin 114 on the bracket. By means of the spring 113, the yoke is normally held in position to disengage clutch member 102 from its cooperating member 101. An electromagnet 115 is mounted on bracket 110 and is adapted when energized to raise arm 112 against the action of spring 113 and thereby cause the yoke to engage clutch member 102 with its cooperating member 101. The energization of electromagnet 115 is controlled by a coin registering mechanism which will be referred to presently.

*Variable speed transmission*

The variable speed transmission 97 is preferably of the type described and claimed in an application of Carl W. Weiss for United States Letters Patent, Serial No. 90,105, filed July 11, 1936. The transmission comprises a casing 117 having a front cover 118 and a rear cover 119 which has a generally conical shape. The front and back covers are secured to the casing by bolts 120. The driving member 96 of the transmission is in the form of a cylindrical roller mounted on the motor driven shaft 95. Shaft 95 is engaged in a bearing in one of the side walls of casing 117 and the end of the shaft is secured against lateral displacement in an opening 121 in the opposite side wall of the casing. The driven member 99 of the transmission is in the form of a disc and has a shaft 122 extending from the rear face thereof connected to the smaller shaft 100. Shaft 100 and its extension 122 are rotatably mounted in bearings (not shown) in the rear cover 119 of the casing, with their axes slightly above the axis of roller 96. A ball 123 having a diameter slightly greater than the shortest distance between the flat surface of disc 99 and the cylindrical surface of roller 96, is disposed between the disc and roller and forms an idler or driving connection between these members (Fig. 13). The space between the disc and roller and the distance that the axis of shaft 104 is disposed above the axis of roller 96 is such that when the ball 123 is moved along the roller it will contact disc 99 along a line intersecting the axis of shaft 104. The ball is arranged in a cage 124 which is movable axially on a rod 125 mounted in the casing 117 parallel to the axis of roller 96. The cage engages the ball lightly on opposite sides to prevent movement of the ball relative to the cage in the direction of the roller axis and yet permit the ball to rotate in the cage. However, the cage does not engage the top or bottom of the ball and the latter is held between the disc and roller only by its weight.

The top of cage 124 is provided with a rack 126 which engages a gear segment 127 secured on the end of a shaft 128. The shaft is rotatably mounted in a bearing 129 secured to the rear face of cover 118 and the outer end of the shaft extends into a hollow boss 130 on the outer face of cover 118. A flexible drive shaft (not shown) is connected to the outer end of shaft 128 inside the hollow boss 130 and extends through a cable 131 to a hollow boss 132 fixed on a price index member 133. The end of the flexible drive shaft inside the hollow boss 132 is connected to the end of a shaft 134 which extends through an opening in the member 133 and is mounted on a gear 135. The gear 135 is rotatably mounted on a support 136 connected to the inside of sub-panel 33. A cylinder lock 137 extends through an opening in sub-panel 33 and is provided on the inner end of its operating shaft (not shown) with a pinion 138 meshing with the gear 135. Thus, when a key is inserted in cylinder 137 on the front of sub-panel 33, the pinion 138 may be rotated thereby rocking the gear segment 127 through gear 135, the flexible drive shaft in cable 131, and shaft 128. The index member 133 rotates with gear 135 and is provided near its lower end with a plurality of openings 139 spaced equidistant from shaft 134. A spring arm 140 is mounted on the inner face of sub-panel 33 and carries a stop 141 which is adapted to enter successively the openings 139 in member 133 as gear 135 is rotated, and when the stop is engaged in one of the openings 139 the gear is held against angular displacement except by rotation of the key operated pinion 138. The index member 133 is provided on its outer face with a price mark for each opening 139, and when any one of the openings 139 is opposite the stop 141, its corresponding price mark is visible through an opening 142 in sub-panel 33.

It will be observed that when gear segment 127 is rocked by rotation of the key-operated pinion 138, cage 124 will be moved along rod 125 and thereby vary the speed ratio of the transmission by changing the radial position of the ball on disc 99. The rack 126 is so arranged with respect to gear segment 127 that when the latter is rocked to its extreme left-hand position, as viewed in Fig. 14, the ball 123 will be disposed a short distance from the center of the driven disc. That is, the ball cannot be adjusted to overlie the center of the disc, in which position the disc would not be driven properly by the driving roller 96. When the ball 123 is at its extreme inner position on the disc, the latter will be driven at its maximum speed. As the ball is moved outwardly on the disc by rocking gear segment 127, the ratio of the angular speed of disc 99 to that of roller 96 will decrease, the ratio being inversely proportional to the distance of the ball from the center of the disc. That is, the disc will be driven at its minimum speed when the ball is disposed at the outer end of its travel on the disc. The flexible shaft within the cable 131 is torsionally rigid so that there is substantially no lost motion in the operative connection between pinion 138 and gear segment 127.

*Cyclometers and automatic cut-off mechanisms*

The shaft 99 is provided intermediate its ends with a gear 150 which meshes with a gear 151 mounted on a shaft 152 (Fig. 2). The latter shaft is suitably mounted in bearings (not shown) on the frame of the machine and has a worm 153 secured on the end thereof. The worm 153 engages a worm wheel 154 which is secured to a shaft 155 mounted in suitable bearings (not shown) on the machine frame. On one end of shaft 155 is a coin metering drum 156 which will be referred to presently, and on the other end is a worm 157 engaging a worm wheel 158 mounted on a shaft 159. The latter is suitably mounted in bearings (not shown) and has fixed on its outer end a sleeve 160 integral with a disc 161 of an automatic cut-off mechanism for stopping the machine after it has operated for a predetermined time interval (Fig. 9). Sleeve 160 is provided with a pair of commutator rings 162 engaging a pair of brushes 163 which will be referred to in greater detail presently. Pivotally mounted on a post 164 on the face of disc 161 is a contact lever 165 (Fig. 11). One end 165ᵃ of the contact lever is adapted to engage a cooperating contact member 166 mounted on disc 161 and suitably insulated therefrom. The other end 165ᵇ of the contact lever is adapted to engage an adjustable contact member 167 mounted in an insulating member 168 on the disc. A spring 169 is connected at one end to a pin 170 on disc 161 and at the other end to contact lever 165, the spring normally urging the lever to a position where its end 165ᵇ engages adjustable contact 167 and its end 165ᵃ is disengaged from contact 166. The two contact members 166 and 167 are electrically connected by a wire 171 which in turn is connected to one of the commutator rings 162 by a wire 172. The other commutator ring 162 is connected to the contact lever 165 by a wire 173.

A disc 175 is rotatably mounted on shaft 159 in opposed relation to disc 161 and is provided on its face with a pin 176. The pin 176 is sufficiently long to engage the end 165ᵃ of contact lever 165, which end is formed with a flange extending outwardly from disc 161. However, the pin is too short to engage the other end 165ᵇ of contact lever 165 and passes over the latter when disc 175 is rotated relative to disc 161. A pinion 177 is loosely mounted on shaft 159 in proximity to disc 175 and is provided with an integral collar 178 having an inside diameter substantially greater than that of shaft 159. The end of collar 178 is formed with a plurality of elongated slots 179 and closely surrounds the circumferential surface of a collar 180 integral with disc 175. An adjustable band 181 surrounds collar 180 near the end thereof and maintains the portions of the collar between the slots in frictional engagement with collar 180. The pinion 177 meshes with the teeth of a vertical rack 182 which is suitably mounted on the machine frame for endwise movement (Figs. 2 and 3). At its lower end the rack carries a piston 183 which is engaged in a cylinder 184 supported in the machine casing. The bottom of piston 183 is formed with a recess in which a flexible washer 185 is secured. A cylindrical weight 186 is secured to rack 182 above cylinder 184 and is provided with a reduced portion 186' which extends into the upper end of the cylinder when the rack is in its lowermost position. The cylindrical weight 186 tapers down to its reduced portion 186' and the tapered portion normally rests on the top of cylinder 184 where it supports the rack in its lowermost position. The lower end of cylinder 184 communicates by means of a pipe 187 with the discharge end of pump 39, so that when the pump is in operation, that is, when it is either recirculating its charge or is pumping through discharge pipe 42, the fluid pressure at its discharge end is transmitted through pipe 187 to the cylinder 184.

An upright member 190 is secured to the horizontal support 36 by means of an angle iron 191 and carries two counting devices 192 and 193 (Figs. 2 and 3). The latter are mounted between the upright member 190 and sub-panel 33 (Fig. 3) and their indicating faces 194 and 195 (Fig. 3) are visible through openings 194' and 195', respectively, in the sub-panel. The counting devices 192 and 193 are of the common reset revolution type and include drive shafts 196 and 197, respectively, for actuating the respective indicating faces, and also resetting shafts 198 and 199, respectively. The resetting shafts are connected to the respective indicating faces by means of a one-way clutch (not shown), so that when the resetting shafts are rotated in a counterclockwise direction as viewed in Fig. 2, they move the indicating faces of the respective counting devices to their initial zero positions, but when the resetting shafts are rotated in the opposite direction they are disconnected from the indicating faces and therefore have no effect.

The resetting shafts 198 and 199 are provided with pinions 200 and 201, respectively, which mesh with the teeth on rack 182 (Fig. 2). The drive shaft 196 has a sprocket wheel 202 fixed thereon, and the latter is connected to sprocket wheel 107 on shaft 104 by means of a chain 203 which passes over idler sprockets 204. The idler sprockets 204 are mounted on a shaft 205 suitably secured to the frame of the machine. The drive shaft 197 of the other counting device is provided on its end with a driven clutch member 206. A cooperating movable clutch member 207 coaxial with clutch member 206 is splined on a shaft 208 rotatably mounted in bearings (not shown) on the machine frame. The movable clutch member 207 is in the form of a collar having a circumferential groove 207' in which the end of a yoke 209 is engaged (Fig. 2). The latter is pivoted at its upper end on the machine frame and has an arm 210 extending at right angles to the yoke from its upper end. A spring 211 is connected at one end to the arm 210 and at the other end to the counting device 193 and normally holds arm 210 in a depressed position in which yoke 209 maintains clutch member 207 disengaged from its cooperating member 206. An electromagnet 212 is suitably secured to the machine frame above arm 210, and when it is energized, it draws arm 210 upwardly against the action of spring 211 thereby causing yoke 209 to engage clutch member 207 with its cooperating member 206. Shaft 208 is adapted to be driven by a sprocket wheel 213 mounted thereon which is connected by a chain 214 to a sprocket wheel 215 on shaft 152.

A lever 218 is pivoted on the frame of the machine adjacent the vertical rack 182 (Figs. 2 and 3). One end 218' of the lever extends obliquely upwardly and is adapted to engage a projection 219 on the rack when the latter is moved upwardly from the position shown in Fig. 2, while the other end of the lever is provided with a horizontal slot 220 through which a pin 221 extends. The pin 221 is connected to the lower end of the plunger 222 of a normally deenergized solenoid 223. When solenoid 223 is deenergized the end 218' of lever 218 adjacent the rack 182 is held away from the rack by pin 221 so that projection 219 may move either upwardly or downwardly past the lever, but when the solenoid is energized, the pin 221 moves the slotted end of lever 218 upwardly thereby projecting the opposite end of the lever into the path of projection 219. In the latter position of lever 218, the projection 219 on the rack may move upwardly past the lever by engaging the end 218' of the lever with its upper edge and forcing it inwardly against the action of the solenoid; but projection 219 cannot move downwardly past the lever because when the lower edge of the projection engages the top of the end 218' of the lever, it acts to move the lever further into the path of the projection.

When pump 39 commences to operate, the pressure at the discharge end thereof is transmitted through pipe 187 to the lower end of cylinder 184 where it acts on the bottom of piston 183. Substantially simultaneously with the starting of pump 39, solenoid 223 is energized by a circuit which will be described presently, thereby projecting the upper end 218' of the lever into the path of projection 219 on the rack. The pressure on the bottom of piston 183 forces rack 182 upwardly so that the projection 219 moves above the upturned end 218' of the lever, and the latter prevents the rack from returning to its lowermost position. During the upward movement of the rack, pinion 177 is rotated rapidly by the rack teeth in a clockwise direction (Fig. 2), and consequently disc 175 is driven by pinion 177 in the same direction through the friction collars 179, 180. The pin 176 on disc 175 normally engages end 165a of the contact lever and holds the latter end against one side of contact member 166, but when disc 175 is rotated by the upward movement of the rack, it moves pin 176 in a counterclockwise direction (Figs. 10 and 11) until disc 175 makes substantially a complete revolution, whereupon pin 176 engages the other side of contact member 166. Any further upward movement of rack 182 after pin 176 strikes contact 166 will cause friction collar 179 to slide on collar 180 of the disc 175. The instant pin 176 disengages end 165a of the contact lever, the latter is acted upon by spring 169 to engage its end 165b with contact 167. Coincident with the raising of rack 182 and consequent rotation of disc 175, presettor motor 91 is started, as will be described presently in greater detail, and drives disc 161 at a relatively low speed through shaft 95, gears 150 and 151, shaft 152, worm 153, worm wheel 154, shaft 155, worm 157, worm wheel 158 and shaft 159. As disc 161 rotates, the end 165a of the contact lever gradually approaches pin 176 on disc 175 which is now held stationary by the rack.

In the event that a transaction is completed before pin 176 is reengaged by the end 165a of the contact lever, solenoid 223 is deenergized so that lever 218 is withdrawn from the path of projection 219, and pressure is released in cylinder 184 by stopping of the pump. Thereupon, the weight 186 causes rack 182 to move downwardly to its initial position and rotate pinion 177 and disc 175 rapidly in a counter-clockwise direction as viewed in Figure 2. Rotation of disc 175 by the downward movement of rack 182 causes pin 176 to move in a clockwise direction (Figures 10 and 11) and reengage the end 165a of the contact lever, thereby engaging the latter end with contact 166 and disengaging end 165b of the contact lever from contact 167. The engaging of the contact lever with contact 167 incident to the upward movement of rack 182 and the subsequent reengagement of the contact lever with contact 166 incident to the downward movement of the rack, as previously described, takes place rapidly due to the fact that disc 175 and pin 176 are rotated at a relatively high speed by the movement of the rack. Accordingly, when pin 176 disengages end 165a of the contact lever incident to the upward movement of the rack, the end 165b of the contact lever immediately engages contact 167 due to the action of spring 169 so that a circuit may be traced from one of the commutator rings 162 through wires 172 and 171, contact 167, contact lever 165, wire 173 and back to the other commutator ring 162. When pin 176 reengages end 165a of the contact lever incident to the downward movement of rack 182, the latter end of the contact lever engages contact 166 substantially simultaneously with the disengagement of contact 167 by the end 165b of the contact lever so that a circuit is traced from one of the commutator rings 162 through wire 172, contact 166, lever 165, wire 173, and back to the other commutator ring 162. Consequently, the two commutator rings 162 are electrically connected by one or the other of the circuits previously traced, except for the very short interval of time during which the contact lever is moved into engagement with one of its contacts 166, 167 and out of engagement with the other.

In the event that disc 161 is rotated sufficiently by motor 91 to engage the end 165a of the contact lever with pin 176 before a transaction is completed, the contact lever will be moved slowly by pin 176 to engage the end 165a thereof with contact 166 and disengage the opposite end from contact 167. This movement of the contact lever is a relatively slow one because the presettor motor 91 drives disc 161 at a relatively slow speed.

The driving connection between motor 91 and disc 161 is such that when the motor has rotated continuously for a period of five minutes, the end 165a of the contact lever will catch up with pin 176 so that further rotation of disc 161 by the motor will move the contact lever slowly and cause the electrical connection between the commutator rings 162 to be broken for the substantial period of time measured by the time required for disc 161 to move the end 165a of the contact lever into engagement with contact 166. This appreciable break is utilized to stop the entire machine, as will be presently described in greater detail. When the machine is thus stopped, it will be apparent that the end 165a of the contact lever will be brought into engagement with contact 166 as a result of the falling of rack 182, and accordingly the circuit previously traced will be restored so that the machine may be restarted for the same or another transaction.

Upward movement of rack 182 also rotates gears 200 and 201 in a clockwise direction as viewed in Fig. 2. Rotation of gears 200, 201 in this direction, however, has no effect upon the counting devices 192 and 193. During the operation of motor 91 the counting device 193 will be actuated each time that clutch 206, 207 is engaged by energization of electromagnet 212. That is, when clutch 206, 207 is engaged during the operation of motor 91, drive shaft 197 of the counting device 193 will be rotated through shaft 92, worm 93, worm wheel 94, shaft 95, gears 150, 151, shaft 152, sprocket wheel 215, chain 214, sprocket wheel 213, shaft 208 and clutches 206, 207. Solenoid 212 is controlled by a coin registering mechanism which is acted upon by each coin and caused to energize the solenoid while clutch 206, 207 rotates an amount dependent on the value of the coin, as will be described presently. Accordingly, counting device 193 will record an indication of the total value of the coins acting upon the coin registering mechanism during a transaction.

Drive shaft 196 of counting device 192 is driven simultaneously with the corresponding shaft of counting device 193 because clutch 101, 102 which drives shaft 136 is operated by solenoid 115 which is connected in the same circuit as solenoid 212, as will be described presently in greater detail. However, clutch member 101 is driven through variable speed transmission 97 and accordingly the amount that drive shaft 196 is rotated during energization of solenoids 115 and 212 is dependent on the setting of the variable speed transmission. In other words, shaft 196 will be rotated an amount directly proportional to the amount that disc 62 is rotated. Therefore, the counting device 192 will furnish an indication of the number of gallons purchased or preset by the sum of money indicated by counting device 193 at the current price shown by the price index member 133 of the variable sped transmission. At the end of a transaction when solenoid 223 is deenergized and the pressure is released in cylinder 184, rack 182 is released so that it moves downwardly under the action of weight 186 and rotates gears 200 and 201 in a counterclockwise direction, as shown in Fig. 2. Rotation of gears 200, 201 in this direction causes resetting of the indicating devices 192, 193 to their initial zero readings. Thereafter, the indicating devices are ready for a new transaction.

The action of clutch 101—102 which controls the presetting of the upper disc 62 is governed by a coin controlled mechanism which will now be described.

*Coin sorting device*

Secured on the inner face of sub-panel 33 is a bracket 244 (Figs. 17 and 18) having a horizontal slot 245 in the vertical leg thereof coinciding with a similar slot 246 in the sub-panel. The slots 245, 246 are adapted to receive coins of any size including a silver dollar. A coin chute 247 having side walls 248 is connected at its upper end to the vertical leg of bracket 244 so that the upper surface of the chute forms a continuation of the bottom of slots 245, 246. The lower end of the chute 247 is supported on the outer end of the horizontal arm of bracket 244. Mounted on the upright leg of bracket 244 is a shelf 249 having downwardly extending flanges 250 connected to the bracket. The edge of shelf 249 nearest the upright leg of bracket 244 is provided with a slot through which a vertical gate 251 extends. The gate lies flat against the upright leg of the bracket and is adapted to be raised and lowered so as to open and close the inner end of the coin slot 245, 246. That is, when the gate is in its lower position, as shown in Fig. 17, it closes the inner end of slot 245, 246 to prevent insertion of a coin, but when the gate is raised it permits a coin to pass through the slot and down the chute 247.

The raising and lowering of gate 251 is controlled by a solenoid 252 fixed to a support 252' connected to the vertical leg of bracket 244 near the top thereof. The solenoid has a plunger 253 which is pivotally connected at its lower end to a lateral flange 254 on the gate. An insulated member 255 carrying an electrical contact 256 is mounted on the inner face of the gate near the top in juxtaposition with a contact 257 on the end of a spring metal arm 258. The arm 258 is supported on an insulating block 259 which is mounted on the shelf 249. When the gate 251 is in either its raised or lowered position, contact 256 is out of engagement with its cooperating contact 257, but as the gate is moved from one position to the other, contact 256 brushes against contact 257 and establishes an electrical connection therewith, as will be described in detail presently.

The downwardly extending flanges 250 of shelf 249 are provided with opposed openings in which the opposite ends of a rod 260 are fixed (Figs. 17 and 18). The side walls 248 of the coin chute extend downwardly from a point below the top of the chute, and mounted on rod 260 in the space between the upper ends of side walls 248 and the gate 251 is a pair of dogs 261. The dogs are adapted to slide along rod 260 and are arranged to be flat against the inner face of the gate beneath the shelf 249. The bottoms of the dogs are beveled to fit closely against the inclined surface of chute 247, and their inner ends are smoothly rounded in a vertical plane to remove the corners and thereby facilitate the entrance of coins and impart to them an impetus derived from a spring action which will be described presently. Each dog 261 has affixed thereto a rod 262 which extends through the adjacent flange 250 and is provided at its free end with an end piece 263 having a pin 264 thereon. The dogs 261 are normally urged towards each other by a pair of springs 265 of equal strength, each of which is connected at one end to one of the flanges 250 and at the other end to the adjacent pin 264. A stop 266 is secured on each rod 262 to limit the amount that it may be moved inwardly by its corresponding spring 265, and the stops are arranged so that the dogs 261 are normally equidistant from the center of slot 245, 246 and spaced apart a distance shorter than the diameter of the smallest coin. It will be apparent that a coin in passing between the dogs will move them apart thereby increasing the tension in springs 265, and when the diameter of the coin has passed the narrowest space between the dogs, the latter will snap toward each other under the action of springs 265 so that the curved rear portions of the dogs will give an impetus to the coin in the direction of chute 247.

Mounted on the chute 247 below the top thereof is a coin sorting device 268 which comprises a plurality of superimposed shelves 269, 270, 271, 272, 273 and 274, one for each coin denomination. The shelves are inclined at the same angle as chute 247, that is, at an angle sufficient to cause coins to descend them by the action of gravity. The bottom shelf 269 is set into the lower end of chute 247 and forms a continuation thereof (Fig. 17). The top shelf 274 accommodates the largest coin, the silver dollar, and together with extensions of side walls 248 forms a channel 274' slightly greater in width than the diameter of a silver dollar. The top shelf is slightly thicker than the coin of the second largest size, the half dollar, and is formed on its undersurface with a channel which cooperates with the top of the second shelf 273 to form a passage 273' for half dollars. Similarly, the shelves 273, 272, 271 and 270 are formed on their under surfaces with channels which cooperate with the upper surfaces of the shelves directly beneath them to form passages 272', 271', 270' and 269' for quarters, nickels, pennies and dimes, respectively.

As shown particularly in Figs. 15 and 17, the shelf 270, which rests on the bottom shelf or chute 247, terminates at its upper end slightly below the lugs 261 and is provided with a central elongated slot (Fig. 15) which is slightly greater in width than the diameter of a dime, but less than the diameter of a penny. The shelf 271, which rests on shelf 270, terminates at its upper end slightly below the upper end of shelf 270 and is provided with a central elongated slot of a width slightly greater than the diameter of a penny but less than that of a nickel. Similarly, each of the shelves 272, 273 and 274 terminates at its upper end slightly below the upper end of the shelf directly beneath it and is provided with a central elongated slot of a width slightly greater than the diameter of the coin accommodated by the passage directly below it but less than that of the coin accommodated by the passage which is formed in part by the top of the shelf. Each of the several slots is centrally disposed with respect to the other slots (Fig. 5). The upper portion of each shelf on both sides of its slot is beveled at its upper corner adjacent the slot to form a curved surface 275 which slopes gradually down to the upper surface of the shelf directly beneath it and contacts the latter shelf along a curved line 276 having a generally parabolic contour. It will be observed by reference to Figs. 17 and 19 that the upper portions of the shelves by reason of their curved surfaces 275 cooperate to form a substantially smooth ridge on both sides of the slots which extends downwardly from the top of chute 247 to the top of shelf 274.

With this construction, it will be apparent that when gate 251 is open a coin may be inserted through slot 245, 246 only by pressing the coin against dogs 261 and forcing the dogs outwardly against the action of springs 265. Accordingly, it is impossible to insert a coin in such a way as to make it descend the chute at an excessive speed. Also, the spring pressed dogs 261 serve to position the coins centrally with respect to the slots in the sorting shelves as the coins are forced between the dogs and to make all the coins pass down the chute at a substantially uniform velocity. This is so because springs 265 are of equal strength so that they will urge a coin toward the center of the chute as the coin passes between the dogs. When a dime is inserted in the slot 245, 246 it descends the center of chute 247 face down after passing between the lugs 261. Since the dime is smaller in diameter than the width of the slot in shelf 270 it will continue down chute 247 between the portions of shelf 270 forming the sides of its slot and will descend through the passage 269'. A penny in passing down the chute will engage the curved surface 275 of shelf 270, since it is greater in diameter than the width of the slot in the latter shelf and cannot therefore pass into the dime passage. The penny will then ride along the curved surface 275 of shelf 270, but since it is smaller in diameter than the width of the slot in shelf 271 it will not engage the portions of the latter shelf forming the sides of its slot, but will pass along shelf 270 over the slot therein and between the walls of the slot in shelf 271. The penny in its downward passage is supported near its periphery by the portions of shelf 270 on either side of the slot therein until it descends into its passage 270'.

Similarly, a nickel will ride over the curved surfaces 275 of shelves 270 and 271, since its diameter is greater than the width of the slot in either of the latter shelves, and will pass along the top of shelf 271 between the walls of the slot in shelf 272. The quarter and half dollar coins will each descend along the curved surfaces 275 in the same manner until it arrives at its own shelf directly below the lowest shelf having a slot wider than its diameter, whereupon it will pass down its shelf between the walls of the slot and into its corresponding passage. The dollar coin will pass over all of the curved surfaces 275 and onto the top shelf 274.

As shown particularly in Fig. 17, the passages 269', 270', 271', 272' and 273' terminate in vertical chutes 278, 279, 280, 281 and 282, respectively, which are welded or otherwise mounted on a plate 283. The plate 283 has openings 284 therethrough at the bottoms of the respective vertical chutes so that when coins pass into the vertical chutes from their respective passages they will fall into the openings 284 in the plate onto a base 285 (Fig. 20). The base 285 is inclined in a direction at right angles to that in which chute 247 extends and is secured to the frame of the machine in any suitable manner. The vertical chutes 278 to 282, inclusive, are in the form of tubes having inside diameters slightly greater than the diameters of their corresponding coins, and if a coin should land on its edge after falling down one of the vertical tubes, it will immediately fall over on its face, since it cannot balance on its edge in the tube on the inclined base 285. The top shelf 274 of the coin sorting device extends directly down to the outer edge of plate 283, and coins descending the latter shelf fall directly onto base 285 where they are stopped in their forward movement by a strip 286 mounted on the base. Plate 283 is inclined at the same angle as base 285, that is, at an angle sufficient to cause coins to slide down base 283 by the action of gravity. The plate rests on the top of the base 285 and is provided with a plurality of parallel slots 287, 287a, 287b, 287c and 287d which cooperate with the base to form channels of sufficient width to accommodate dime, penny, nickel, quarter and half-dollar coins, respectively (Fig. 16). The slots 287 to 287d, inclusive, extend downwardly from openings 284 so that when coins fall onto the inclined base 285 from their respective vertical chutes, they will immediately slide down the base beneath the lower edges of their vertical chutes and into their respective channels formed by the slots and the base. The strip 286 is spaced a sufficient distance from the edge of plate 283 to provide a downwardly extending channel 287e for accommodating the dollar coin.

*Coin registering mechanism*

Since the means for registering the coins of the several denominations after they reach their respective channels on the inclined base 285 are substantially the same for each denomination, it will be sufficient to refer in detail to only one of them. For convenience, the means for registering dimes will be described in detail, and the parts thereof will be designated in the drawings by numbers without subscripts, while the corresponding parts of the coin registering means for pennies, nickels, quarters, half-dollars and dollars will be designated by the same numbers with the subscripts, a, b, c, d, and e, respectively.

As shown particularly in Figs. 19 and 20, the base 285 is provided near its lower end with a slot 290 directly beneath the slot 287 in plate 283. A plate 291 is pivotally mounted on a pin 291' in slot 290 and normally lies flush with the top of base 285 with its upper end resting on a projection 292 integral with the base. A spring 293 is connected at one end to the bottom of plate 291 above pin 291', and at the other end to a projection 294 on the bottom of base 285, the spring serving to hold plate 291 in its normal position against projection 292. At the lower end of plate 291 is an inclined shelf 295 pivotally mounted on a pin 296. The upper end of shelf 295 is provided with a downwardly extending flange 297. Shelf 295 normally occupies the position shown in full lines in Fig. 20, in which its upper surface lies flush with the surface of plate 291 when the latter is held flush with base 285. Mounted on the top of base 285 near the lower edge thereof is a cross member 297' on which is secured an insulated member 298 carrying a pair of contact arms 299 and 300, respectively. Contact arms 299, 300 are provided with a pair of normally open contacts 301. The contact arm 300 is somewhat longer than its cooperating arm 299 and carries at its end a roller 302 which normally rests on the top of shelf 295. When a dime D falls into its channel on the top of base 285, it normally slides down the base over the top of plate 291 and onto shelf 295 where it engages roller 302. By the time the coin has engaged the roller, it has acquired sufficient momentum to raise the roller and pass beneath it, thereby causing contacts 301 to close.

Connected to the bottom of base 285 above plate 291 are two spaced lugs 303, each of which has an arm 304 pivotally connected thereto. A cross member 305 is connected to arms 304 and is provided with an adjustment screw 306, the end of which engages plate 291 near its upper end. The cross member 305 is held substantially parallel to base 285 by means of a link 307 pivotally connected at one end to one of the arms 304 and at its other end to a plunger 308 of a solenoid 309. The latter is mounted on a bracket 310 secured to an upright member 311 which in turn is connected at its base to a cross member 312 secured to the top of plate 283 over the slots therein. The portions of cross member 312 overlying channels 287 are cut as shown at 312' to provide a substantial clearance above plate 291. When solenoid 309 is deenergized (Fig. 20) its plunger supports cross member 305 in its lowermost position so that adjustment screw 306 permits plate 291 to lie flush with the top of base 285. However, when solenoid 309 is energized, its plunger swings cross member 305 upwardly causing adjustment screw 306 to rotate plate 291 on its pivot against the action of spring 293 to the dotted line position shown in Fig. 20. A vertical coin chute 313 is mounted directly beneath plate 291 and extends crosswise of the base so that it underlies the corresponding plates 291a, 291b, 291c, 291d, and 291e for the other coin denominations. It will be apparent that when plate 291 is moved to the dotted line position shown in Fig. 20 upon energization of solenoid 309, all of the coins resting on the plate and subsequently passing down base 285 will fall into vertical chute 313. The cross member 312 serves to prevent any coins on the upper part of plate 291 from being tossed therefrom when the plate is swung to its dotted line position shown in Fig. 20.

A solenoid 314 is mounted on a bracket 315 connected to the supporting member 311 and is provided with a plunger 316. A link 317 is pivotally connected at one end to the lower end of plunger 316 and at its other end to one end of a curved link 318. The lower end of the latter link is fixed to one side of shelf 295 above its pivot 296. Also mounted on supporting member 311 is an insulated member 319 carrying two adjacent movable contact arms 320 and 321 (Figs. 20 and 21) and two adjacent stationary contact arms 320' and 321', respectively, cooperating with the movable arms. The two pairs of contact arms 320, 320' and 321, 321' are provided with normally open contacts 322 and 323, respectively. The lower portion of insulated member 319 carries two adjacent movable contact arms 324 and 325 and two adjacent stationary contact arms 324' and 325', respectively, cooperating with movable arms 324 and 325. The two pairs of contact arms 324, 324' and 325, 325' are provided with normally closed contacts 326 and 327, respectively. The four movable contacts arms 320, 321, 324 and 325 are insulated from each other and are connected at their outer ends to the lower end of plunger 316. When solenoid 314 is deenergized, plunger 316 is in its lower position in which shelf 295 is held flush with plate 291, and contacts 322 and 323 are open and contacts 326 and 327 are closed. When solenoid 314 is energized its plunger is drawn upwardly causing shelf 295 to assume the dotted line position shown in Fig. 20. Energization of solenoid 314 also causes contacts 322 and 323 to close and contacts 326 and 327 to open. A vertical coin chute 328 is mounted directly beneath shelf 295 adjacent vertical chute 313 and extends across base 285 so that it underlies the shelves 295a, 295b, 295c, 295d and 295e of the other coin chutes.

The closing of contacts 301 in response to the presence of a coin on shelf 295 prepares a metering circuit which will be described by reference to the complete wiring diagram shown in Fig. 28. Referring to Fig. 28, the numeral 330 designates a source of alternating current, one terminal of which is connected by a bus 331 to one terminal of the high tension side 332 of a step down transformer. The other terminal of the high tension side 332 of the transformer is connected to the contact member 333 of a normally open prepare switch 334. The latter is connected to the other terminal of the current source by a bus 335 so that when switch 334 is closed current will flow from one side of the current source through the high tension side 332 of the transformer, switch 334 and back to the other side of the current source. The low tension side 332' of the step down transformer has one terminal connected to a ground Gr, and the other terminal has a wire 336 leading therefrom to a terminal 337, from which a circuit is traceable through relay 338, terminal 339 to contact member 340 of a normally open ground switch 341. Another circuit is traceable from terminal 337 through relay 342, terminal 343, wire 344 to contact 345 of a normally closed switch 346, and from the latter through wire 347, one of the brushes 90 (Fig. 3) and its corresponding commutator ring 88, wire 348, contact arm 81 on presettor disc 62 (Fig. 7), normally open contacts 81', the other contact arm 81, wire 349, another of the commutator rings 88 and its corresponding brush 90, and wire 350 to contact 351 of a normally open ground switch 352. A red light R is connected between the terminals 337 and 343, and an amber light A is connected between terminal 339 and wire 336.

The wire 336 is provided with an intermediate terminal 353 from which an energizing circuit for solenoid 71 is traceable through wire 354, one of the brushes 90 and its corresponding commutator segment 88, the terminal 355 where the circuit divides, one path leading through solenoid 71 (Figs. 2, 3 and 7) to terminal 356 where it again divides, one path leading through wire 358, commutator ring 88 and its corresponding brush 90, wire 359, to contact 360 of a normally closed switch 361, and from the latter to ground Gr. The other branch of the circuit through terminal 355 is traceable through wire 362, the short contact arm 67 (Fig. 6), normally open contacts 67', the longer contact arm 67 which is connected to the plunger 73 of solenoid 71, wire 363, commutator ring 88 and its brush 90, wire 364, one of the commutator rings 162 (Fig. 9), through contact lever 165 by one of the circuits previously traced, the other commutator ring 162, wire 365, relay 366 and back to the grounded terminal of the low tension side of transformer 332, 332'. The other circuit through terminal 356 completes a holding circuit for solenoid 71 and is traceable to the shorter contact arm 66 (Fig. 6), normally open contacts 66', the longer contact arm 66 which is connected to the plunger of solenoid 71, commutator ring 88 and its brush 90, wire 368, terminal 369, wire 370, contact 371 of a normally closed switch 372 which is mounted on the plunger of solenoid 342, wire 373, switch member 374 which is mounted on the plunger of solenoid 338, contact 375 of switch 374, and wire 376 to ground Gr. A green light G is connected between terminal 369 and wire 365. Also, a contact 371' prime is connected to wire 350 and is engaged by switch 372 when solenoid 342 is energized.

From the bus 331 of the current source 330 another circuit is traceable through terminal 380, wire 381, solenoid 45 (Figs. 1 and 2), and normally open contact 382 of a grounded switch 383. The switch 383 is mounted on the plunger of relay 342, and since the latter is normally deenergized, switch 383 is normally in its lowermost position in which it is disengaged from contact 382 but engaged with a contact 384. Contact 384 is connected by a wire 385 to a normally open switch 386 which is mounted on the plunger of relay 338, and the switch 386 has a contact 387 which is connected by a wire 388 to terminal 389. The pump motor 37, cyclometer resetting solenoid 223 and presettor motor 91 are connected in parallel between wire 381 and a common terminal 389 which in turn is connected to a normally open switch 390 mounted on the plunger of relay 366. The normally open switch 390 has a contact 391 connected to ground Gr.

A circuit is traceable from another terminal 394 on bus 331, through wire 395 to a terminal 396 where the circuit divides, one branch leading through wire 397 to terminal 398 where it again divides, one branch leading through wire 399, brush 90 and its corresponding commutator ring 88, wire 400, one of the contact arms 76 on disc 62 (Figs. 4 and 6), normally closed contacts 76', the other contact arm 76, the longer contact arm 68 which is connected to the plunger of solenoid 71, normally open contacts 68', the shorter contact arm 68, commutator ring 88 and its brush 90, wire 401, solenoid 252 which controls the coin gate 251 (Fig. 17), contact member 256 on the coin gate, and wire 402 to contact 403 of a normally closed ground switch 404. The other circuit through terminal 398 is traceable through wire 405, solenoid 309 which actuates plates 291 to 291e, inclusive, on the bottom of the coin channels 287 to 287e, inclusive (Figs. 16 and 20), and from solenoid 309 to contact member 257 (Fig. 17) which is adapted to engage contact 256 when coin gate 251 is raised or lowered. The other circuit through terminal 396 leads through a relay 406 having a plunger which carries the switch 346, and from relay 406 through wire 407 to terminal 408 where the circuit again divides, one branch leading through wire 409 to a normally open switch 410, contact 411 of the normally open switch 410, terminal 412, solenoids 115 and 212 (Fig. 2) which are connected in parallel, terminal 413, and wire 414 to a grounded terminal 415. A resistance 406' is connected in parallel with the relay 406.

From the ungrounded terminal of the low tension side 332' of the step down transformer, a circuit is traceable through resistance 418, wire 419 to a switch member 420 which is controlled by a key-operated switch actuator 421 and from switch 420 the circuit divides, one branch leading through contact 422, wire 423, relay 424, which has a plunger carrying the normally open switch 410, to the grounded terminal 415. The other branch of the circuit through switch 420 is traceable through contact 425, wire 426, contact arm 325 which is mounted on upright 311 and is connected to the plunger 316 of solenoid 314 of the dime registering mechanism (Figs. 20 and 21), through normally closed series connected contacts 327, 327a, 327b, 327c, 327d and 327e of the dime, penny, nickel, quarter, half-dollar and dollar coin registering mechanisms, respectively. From the contact arm 325'e of the dollar coin registering mechanism, the circuit continues through wire 427 to a grounded resistance 428. When switch 420 is closed, as shown in Fig. 28, it engages its contacts 422 and 425, but when the switch is opened by the key-controlled actuator 421 it engages a contact 429 which is connected to a normally opened operating switch 430 having a contact 431 connected to wire 423.

The other branch of the circuit through terminal 408 previously referred to is traceable through wire 433 to a terminal 434 where it again divides, one branch being traceable through stationary contact arm 320e of the dollar coin registering mechanism (Fig. 21), normally closed contacts 326e, movable contact arm 324e, and from the latter through the normally closed contacts 326d, 326c, 326b, 326a and 326 of the half-dollar, quarter, nickel, penny and dime coin registering mechanism, respectively, which are contained in series. From the movable contact arm 324 of the dime registering mechanism, the circuit continues to a terminal 435, through stationary contact arm 299 of the dime registering mechanism (Fig. 20), normally opened contacts 301, the longer contact arm 300, to a terminal 436, through solenoid 314 of the dime registering mechanism (Fig. 20), wire 437, to the movable contact arm 331 of the normally opened switch 329 of the dime registering mechanism. The remainder of the circuit from contact arm 321 will be described presently. The normally opened contacts 301, 301a, 301b, 301c, 301d and 301e of the dime, penny, nickel, quarter, half-dollar and dollar coin registering mechanisms respectively, are connected in parallel from terminal 435 through a wire 435', and each of the contacts forms part of a circuit similar to that traced through contacts 301. Thus, the parallel circuits through normally open contacts 301a, 301b, 301c, 301d, and 301e are traceable to the movable contact arms 331a, 331b, 321c, 321d, and 321e, respectively, through paths similar to that traced from contacts 301.

The other branch of the circuit through terminal 434 is traceable through wire 434', to the series connected stationary arms 320e, 320d, 320c, 320b, 320a and 320 of the dollar, half-dollar, quarter, nickel, penny and dime coin registering mechanisms, respectively. The contacts of the latter combine the normally opened as previously described and their movable contact arms are connected by wires 440, 440a, 440b, 440c, 440d and 440e, respectively, to the terminals 441, 441a, 441b, 441c, 441d, and 441e, respectively.

The continuations of the circuits through movable contact arms 321 to 321e, inclusive, previously referred to, will now be described. The latter contact arms are connected by wires 440, 440a, 440b, 440c, 440d and 440e, respectively, to the stationary contact arms of normally open contacts 442, 442a, 442b, 442c, 442d, and 442e, respectively. The movable contact arms 441 of the respective contacts 442 are of spring metal and are formed with extensions which engage the peripheries of axially spaced rings 443, 443a, 443b, 443c, 443d and 443e, respectively, on the coin metering drum 156 (Figs. 2 and 23 to 25). Ring 443a of the penny metering mechanism is provided with a plurality of fixed pins 444a (Fig. 26) spaced equidistantly around its periphery, and adjacent the row of pins 444a on ring 443a is a second row of pins 445a (Fig. 27) of the same number as pins 444a and equidistantly spaced around the periphery in staggered relation with respect to pins 444a. Each pin 445a projects through an elongated slot 446a extending at right angles to the drum axis, and is secured by a nut 447a threaded on its inner end. By loosening the nuts 447a the pins 445a may be adjusted circumferentially on the drum. The circumferential distance $d$ between each of the pins 444a and the nearest pin 445a in the direction opposite to the direction of rotation of the drum is one one-hundredth of the circumference of the rings on drum 156. Ring 443b of the nickel metering mechanism is provided with a plurality of pins 444b suitably spaced around its circumference, and adjacent to pins 444b is a row of pins 445b of the same number as pins 444b and similarly spaced around the periphery of ring 443b in staggered relation to pins 444b. The circumferential distance $d5$ between each pin 444b and the nearest pin 445b in the direction opposite to the direction of rotation of the drum is one twentieth of the circumference of the drum rings. Similarly, rings 443 and 443c of the dime and quarter metering mechanisms are each provided with a row of pins 444 and 444c, respectively, spaced around their circumferences, and a second row of pins 445 and 445c, respectively, of the same number as the respective pins 444 and 444c and spaced in staggered relation to the pins 444 and 444c. The circumferential distance $d10$ between each pin 444 and the nearest pin 445 in the direction opposite to the direction of rotation of the drum is one tenth of circumference of the drum rings, and the corresponding distance $d25$ between each pin 444c and the nearest pin 445c is one quarter of the circumference. Ring 443d of the half-dollar metering mechanism is provided with two diametrically opposed pins 444d and two diametrically opposed pins 445d adjacent the pins 444d, and the ring 443e of the dollar metering mechanism has two adjacent pins 444e and 445e.

The movable contact arms of contacts 442, 442a, 442b, 442c, 442d and 442e are connected by wires 450, 450a, 450b, 450c, 450d and 450e, respectively, to individual points 451 of a distributor or circuit selector 452. The head 453 of the distributor is connected by a wire 454 to bus 335 of alternating current source 330 which is grounded at terminal 455. As shown in Fig. 2, the distributor 452 is driven by the drive shaft of pump motor 27.

The pins 444 to 444e, inclusive, are adapted to engage the respective movable contact arms 456, 456a, 456b, 456c, 456d and 456e of normally closed contacts 457, 457a, 457b, 457c, 457d and 457e, respectively, when drum 156 rotates. The stationary contact arms of the latter contacts are grounded, while the movable arms are connected by wires 458, 458a, 458b, 458c, 458d and 458e, respectively, to the respective stationary contact arms 321', 321'a, 321'b, 321'c, 321'd and 321'e of normally open contacts 329.

*Operation*

Assuming that the machine is idle, a prospective customer first presses the "prepare" button 334 (Fig. 28) so that the high tension side 332 of step down transformer 332, 332', is energized. Simultaneously with the energizing of the high tension side 332 of the transformer, the low tension side 332' of the transformer energizes presettor solenoid 71 by the energizing circuit previously traced. Energization of solenoid 71 causes pin 73 to be withdrawn from the opening 60 in lower disc 54 and raised to its uppermost position, thereby closing contacts 66', 67' and 68' (Figs. 6 and 7). The closing of contacts 66' establishes the holding circuit for presettor solenoid 71 previously traced. Accordingly, when the customer releases prepare button 334 after a brief closure thereof, the presettor solenoid 71 will remain energized by the holding circuit previously traced.

The closing of contacts 67' in response to energization of presettor solenoid 71 causes relay 366

(Fig. 28) to be energized by the circuit traceable from the ungrounded terminal of low tension side 332' of the transformer, through contact 353, wire 354, brush 90 and its commutator ring 88, terminal 355, wire 362, stationary contact arm 67, contacts 67', movable contact arm 67, wire 363, commutator ring 88 and its brush 90, wire 364, one of the brushes 163 of the automatic cut-off mechanism (Figs. 9, 10 and 11), its corresponding commutator ring 162, wire 172, contact 166, the end 165a of contact lever 165, wire 173, the other commutator ring 162 and its brush 163, wire 365, relay 366 and back to the grounded terminal of low tension side 332' of the transformer. Energization of relay 366 causes switch 361 to disengage contact 360 and engage contact 461, thereby establishing a circuit from bus 331 of current source 330, through high tension side 332 of the transformer, wire 460, contact 461, ground switch 361, and back to the grounded side of the current source. Since the latter circuit is established substantially simultaneously with the closing of "prepare" switch 334, as in the case of the holding circuit for solenoid 71, it serves to maintain the high tension side 332 of the transformer energized after switch 334 is released.

The energizing of relay 366 also causes switch 390 to engage its contact 391 so that pump motor 37 is energized by the circuit traceable from bus 331 of current source 330 through terminal 380, wire 381, pump motor 37, terminal 389, switch 390, grounded contact 391, and back to the grounded side of current source 330. The cyclometer reset solenoid 223 and the presettor motor 91 are also energized with the closing of switch 390, by relay 366 since they are connected in parallel with pump motor 37. Pump 39 upon being driven by motor 37 recirculates its charge back into the gasoline reservoir (not shown) and is prevented from discharging through delivery pipe 42 and hose 43 (Fig. 1) because delivery valve 44 is closed. The pressure at which pump 39 recirculates is transmitted through pipe 187 to cylinder 184 (Fig. 1) where it acts on the bottom of piston 183 (Fig. 3) and raises rack 182. As the rack moves upwardly it rotates pinion 177 and disc 175, thereby causing pin 176 to disengage the end 165a of the contact arm and engage contact 166 so that the contact arm disengages contact 166 and engages contact 167. This movement of contact arm 165 is so rapid that the electrical connection previously traced between brushes 163 by way of the contact arm is broken for a period which is not of sufficient duration to deenergize relay 366. The raising of rack 182 also rotates cyclometer pinions 200 and 201, but as previously described this has no effect on the cyclometers. Should the pressure in pump 39 for any reason fall below that required to maintain the rack in its raised position during the transaction, the rack is prevented from returning to its initial depressed position by the cam end 218' of lever 218 which is projected into the path of latch 219 on the rack by the energized solenoid 223.

The starting of presettor motor 91 causes presettor clutch member 101 and cyclometer clutch member 207 (Fig. 2) to be driven through the driving connections previously described, but since solenoids 115 and 212 are deenergized, the clutches 101, 102 and 207, 208 are disengaged and their driving members rotate idly. The presettor motor 91 also drives coin metering drum 156 and disc 161 of the automatic cut-off mechanism (Fig. 2) through the driving connections referred to previously. Rotation of disc 161 causes the end 165a of contact lever 165 to gradually approach pin 176 which is now held stationary by the rack (Figs. 2, 9 and 11).

Closure of contacts 68' in response to the energizing of presetter solenoid 71 establishes a circuit which is traceable from bus 331 of current source 330, terminal 394, wire 395, terminal 396, wire 397, terminal 398, wire 399, brush 90 and its commutator ring 88, wire 400, one of the contact arms 76 (Fig. 4), normally closed contacts 76', the other contact arm 76, movable contact arm 68 (Fig. 6), contacts 68', stationary contact arm 68, commutator ring 88 and its brush 90, wire 401, coin gate solenoid 252 (Fig. 17), contact member 256 on coin gate 251, wire 402, contact 403, to the grounded switch 404. Accordingly, solenoid 252 is energized and raises coin gate 251 to permit the insertion of coins through slot 245, 246. As the coin gate moves upwardly its contact member 256 engages contact 257 (Fig. 17), whereupon solenoid 309 (Fig. 20) is energized by a circuit parallel to that previously described and traceable from terminal 398, through wire 405, solenoid 309, contact 257, to contact member 256. Energization of solenoid 309 causes its plunger 308 to raise arms 304 and cross member 305, so that the upper end of screw 306 on cross member 305 will swing plate 291 to the dotted line position shown in Fig. 20. Should any coins remain on plate 291 due to incorrect operation in a previous transaction, they will slide off the plate through slot 290 and into vertical chute 313 where they will pass down to a coin return box (not shown) which is accessible to the customer. Thus, incorrect operation in any transaction is minimized in that it does not effect future transactions. It will be understood that plates 291a, 291b, 291c, 291d and 291e in the other coin channels will also be swung in a similar manner by their respective adjustment screws 306a etc. on cross member 305, and any coins on the latter plates will also fall into vertical chute 313 and pass to the coin return box. When coin gate 251 reaches its upper position, its contact member 256 again disengages contact 257, thereby deenergizing solenoid 309 so that plates 291 to 291e, inclusive, will be returned to their initial positions flush with base 285 by their respective springs 293.

It will be observed that when the transformer 332, 332' is energized in response to the closing of "prepare" switch 334, a circuit is completed through relay 424, by way of the ungrounded terminal of low tension side 332' of the transformer, resistance 418, wire 419, the key controlled switch 420, contact 422, wire 423, relay 424, and grounded contact 415. However, relay 424 is not energized sufficiently to close switch 410 because it is shunted from key controlled switch 420 through contact 425, wire 426, contact arm 325, series connected contacts 327, 327a, 327b, 327c, 327d and 327e, wire 427, and grounded resistance 428. That is, solenoid 424 cannot be energized sufficiently to close switch 410 unless and until the shunt previously traced is broken by the opening of one of the series connecting contacts 327 to 328e, inclusive. Accordingly, switch 410 will remain open and the two solenoids 115 and 212 for the presetter and coin registering cyclometer, respectively, will remain deenergized.

It will be apparent that the preparatory functions described thus far will occur substantially simultaneously with the pressing of "prepare" button 334, because all of them are initiated by electrical circuits. As soon as the holding circuit for presetter solenoid 71 and the energizing circuit for relay solenoid 366 are established, the green light G will be energized because it is connected across these circuits, as previously described. The green light will thus provide a visible signal for the customer, indicating that the preparatory operations of the machine have gone successfully to completion.

The customer now inserts coins of any number and of any of the several denominations into the coin slot 245, 246. The coins slide down the coin sorting chute 268 in the manner previously described and fall onto the top of base 285 (Figs. 17 and 20). From the upper end of base 285 the coins slide down their respective channels 287 to 287e, inclusive, over their respective plates 291 to 291e, inclusive, and onto their respective shelves 295 to 295e, inclusive, where they are stopped and held by engagement with cross member 297' (Figs. 16 and 20). Each coin D as it slides onto its shelf 295 passes under its roller 302, thereby raising the roller and closing the corresponding contacts 301, and the coin remains in this position to await the action of its metering circuit which is prepared by the closing of its contacts 301. The operation of the metering circuits will be described presently. In the event that several coins of the same denomination are inserted by the customer, the first coin will pass onto its shelf 295 and the other coins will arrange themselves in order on plate 291 and base 285 behind the first coin. Each of the coin shelves 295, 295a, etc. is of substantially the same length as the diameter of its corresponding coin so that the coin immediately behind that on the shelf will rest entirely on the corresponding plate 291. If the coins in any of the channels 287 to 287d, inclusive, align themselves as far back as the upper end of base 285, the next coins in order will arrange themselves face down in their corresponding vertical chute above base 285.

Referring now to Fig. 28, assume that the coin operated switches 301 to 301e, inclusive, are closed by coins on their respective shelves 295 to 295e, inclusive. As the coin metering drum 150 rotates, the pins thereon close the normally open contacts 442, 442a, etc., and open the normally closed contacts 457, 457a, etc., in rapid succession. When one of the normally open contacts 442, 442a, etc., is closed at the same time that its corresponding distributor point 451 is engaged by the head of distributor 452, a circuit is established through the corresponding coin operated contacts 301 which energizes its solenoid 314. That is, assuming for example that contacts 442a of the penny metering mechanism are closed by a pin 444a simultaneously with the engagement of the distributor head 453 with the distributor point connected to the movable arm of contacts 442a, a circuit will be established which is traceable from bus 331 of current source 330 through terminal 394, wire 395, terminal 396, relay 406 and its parallel connected resistance 400', wire 407, terminal 408, wire 433, terminal 434, series connected contacts 326e to 326, inclusive, movable contact arm 324, terminal 436, wire 435, contacts 301a, terminal 436a, solenoid 314a, wire 437a, movable contact 321a, wire 440a, contacts 442a, wire 450a, distributor point 451, head 453 of the distributor wire 454, and back to the grounded side of the current source.

Upon energization of solenoid 314a, contacts 326a and 327a are opened and contacts 322a and 323a are closed. The opening of contact 326a breaks the energization circuit of solenoid 314a previously traced, but the contacts are so arranged that simultaneously with the opening of contacts 326a the contacts 322a close and establish a holding circuit for solenoid 314a. The holding circuit is traceable from terminal 434 through wire 435', the series connected stationary contact arms of contacts 322e, 322d, 322c, 322b and 322a, through contacts 322a, wire 438a, terminal 436a, solenoid 314a, terminal 436a, solenoid 314a, wire 437a, movable contact arm 321a, contacts 323a, wire 458a, closed contacts 457a, to the ground. The holding circuit previously traced will remain energized after contacts 442a are opened and until contacts 457a are opened by a pin 445a on the coin metering drum.

Upon the breaking of contacts 327a, in response to the energization of solenoid 314a, the branch circuit previously traced leading from contact 425 through series connected contacts 327, 327a, etc., to the grounded resistance 428 will be broken. Accordingly, all of the current passing through switch member 420 from the ungrounded terminal of low tension side 332' of the transformer will pass through switch 420, contact 422, wire 423, relay 424, to the grounded terminal 415. The increased current through relay 424 resulting from the breaking of contacts 327a energizes relay 424 sufficiently to close the movable switch 410 so that current may flow through solenoids 115 and 212 by way of the circuit traceable from bus 331 of current source 330, terminal 394, wire 395, solenoid 406, wire 407, terminal 408, wire 413, contact arm 410 and its contact member 411, terminal 412, through the parallel connected solenoids 115 and 212, wire 414 to the grounded terminal 415. The energizing of solenoids 115 and 212 causes the engagement of clutches 101, 102 and 206, 207, respectively, which are controlled by the solenoids, and thereupon the presetter disc 62 and gallon cyclometer 192 will be driven from presetter motor 91 through clutch 101, 102 and the coin cyclometer will be driven by the presetter motor through clutch 206, 207.

The presetter disc 62 and the coin cyclometer 103 will be driven through their respective clutches 101, 102, and 206, 207 until the metering drum 150 makes one-hundredth of a revolution, whereupon one of the pins 445a will engage the end of contact arm 456a and cause contacts 457a to open. The opening of contacts 457a breaks the holding circuit for solenoid 314a previously traced, so that contacts 326a and 327a are again closed and contacts 322a and 323a are again opened. The closing of contacts 327a re-establishes the branch circuit from contact 425 through series connected contacts 327a to the grounded resistance 428, and accordingly the current through relay 424 will be reduced to its normal value which is insufficient to maintain switch 410 closed. The opening of switch 410 breaks the energizing circuit of solenoid 115 and 212 previously traced, thereby causing clutches 101, 102 and 206, 207 to assume their initial disengaged positions.

The operation of the metering mechanisms of the other coin denominations is similar to that described in connection with the penny metering mechanism. In the metering of each of the other coins, however, the grounded contacts 457 will remain closed for a longer period following the initiation of their respective coin metering circuits, due to the increase in the circumferential spacing between the initiating pin 444 and the pin 445 which completes the metering by breaking contacts 457. Thus, when the dollar metering circuit is initiated by the closing of contacts 442e simultaneously with the engagement of its corresponding distributor point 451 by the distributor head, presettor solenoid 115 and cyclometer solenoid 212 will become energized and remain so until coin metering drum 156 has made a complete revolution, that is, until pin 445e opens contacts 457e. Similarly, the pins on the metering drum will maintain the nickel metering circuit closed for one-twentieth of a revolution of the drum, the dime metering circuit for one-tenth of a revolution, the quarter metering circuit for one-fourth of a revolution, and the half-dollar metering circuit for one-half of a revolution of the drum.

It will be observed by reference to Fig. 20 that as soon as one of the solenoids 314 is energized in response to the initiation of a metering circuit, the plunger 316 of the energized solenoid will operate through levers 317 and 318 to swing its corresponding coin shelf 295 to the dotted line position shown in Fig. 20. Thereupon, the coin which closed the contacts 301 of the initiated metering circuit will slide off its shelf 295 into the vertical coin chute 328 which conveys the coin to a storage box (not shown). During the time that shelf 295 is in its tilted position shown in dotted lines in Fig. 20, the coin immediately behind shelf 295 is prevented from falling into coin chute 328 by the downwardly extending flange 297 on the shelf. When solenoid 314 is deenergized upon breaking of the metering circuit by the opening of contacts 457, the solenoid plunger 316 returns to its initial position, thereby moving coin shelf 295 into its normal position flush with plate 291. Thereupon, the coin at the lower end of plate 291 slides down on to shelf 295 under the movable contact arm 390 and maintains its corresponding contacts 391 closed.

When all the coins have been metered in the manner described, pin 73 of presettor disc 62 will be advanced ahead of hole 60 in the cooperating disc 54 through an angle commensurate with the total value of the coins metered. The amount of the advance, however, will also be dependent upon the setting of the variable speed transmission 97 as determined by the position of price index member 133 (Fig. 12). That is, when price index member 133 is set by the key-operated pinion 138 to a position corresponding to a high price, the speed at which the driving member 98 drives the driven member 99 of the variable speed transmission will be at a relatively low rate, so that the total amount which presettor member 62 is advanced during the engagement of clutch 101, 102 will be less than in the case where the price index member 133 is set for a lower price. In the latter case, the driven member 99 will be rotated at a relatively high speed so that clutch 101, 102 will transmit more revolutions during a predetermined period of engagement than in the case where the variable speed transmission is set for a higher price, that is, for a lower speed. It will be observed that the coin cyclometer 193 will register an amount commensurate with the total number of revolutions transmitted by cyclometer clutch 206, 207, which in turn is proportional to the total value of the metered coins without regard to the current price as determined by the setting of variable speed transmission 97.

The machine is now ready for the delivery of gasoline. To start the delivery the customer presses button 352 thereby energizing solenoid 342 through its energizing circuit previously traced. The energizing of solenoid 342 causes switch 372 to disengage contact 371 and engage contact 371', and also causes switch 383 to disengage contact 384 and engage contact 382. The disengagement of contact 371 by switch 372 breaks the holding circuit for presettor solenoid 71 previously traced. Thereupon, pin 73 on the plunger of solenoid 71 falls upon the upper surface of the lower disc 54, that is, into its intermediate position, and in this position contacts 66' and 68' are opened, but contacts 67' remain closed. Upon opening of contacts 68', the circuit through coin gate solenoid 252 previously traced is broken, with the result that the coin gate falls to its initial position over the coin slot 245, 246. As the coin gate falls, its contact member 256 engages contact 257, thereby reestablishing the circuit previously traced through solenoid 309. Energization of the latter solenoid causes each of the coin plates 291, 291a, etc., to be tilted to the dotted line position shown in Fig. 20, so that if for any reason some of the coins inserted by the customer are not metered, the unmetered coins will be returned to the customer through the vertical coin chute 313.

The engagement of contact 371' by switch 372 establishes a holding circuit for relay 342 which is traceable from terminal 337 through relay 342, wire 344, contact 345, switch 346, wire 347, brush 90 and its commutator ring 88, wire 348, normally closed contacts 81', wire 349, commutator ring 88, and its brush 90, wire 350, contact 371', switch 372, wire 373, switch 374 and its contact 375, wire 376, to the grounded switch 352. Accordingly, when the customer releases the delivery button 352, solenoid 342 will remain energized even though the delivery button is pressed for only an instant. When relay 342 is energized in response to operation of the delivery button, the red light R is energized, since the latter is connected in parallel with relay 342. The light R indicates to the customer that the delivery mechanism is in operation.

The engagement of contact 382 by switch 383 in response to the energizing of relay 342 causes the delivery valve solenoid 45 to be energized by a circuit traceable from one side of current source 330 to terminal 380, wire 381, solenoid 45, contact 382, switch 383 to the ground. The energizing of solenoid 45 causes its plunger 46 to open delivery valve 44, whereupon the pump commences to deliver gasoline through discharge pipe 42 and hose 45. During the delivery of gasoline, volumeter 41 rotates the lower disc 54 in a clockwise direction (Fig. 2) so that the hole 60 in the lower disc gradually approaches pin 73 on the presettor disc (Figs. 4, 5 and 6). When the hole 60 arrives below pin 73 on the upper disc, that is, when the lower disc is rotated through an angle commensurate with the amount of gasoline purchased as determined by the presetting of the upper disc, pin 73 will fall through the opening and thereby disengage contacts 67', which remained closed while the pin rested on the top of lower disc 54. Thereupon, the energizing circuit for relay 366 previously traced will be broken so that the plunger of the solenoid will return to its initial position causing switch 361 to disengage contact 461 and reengage contact 360, and also causing switch 390 to disengage contact 391. The disengagement of contact 461 by switch 361 breaks the energizing circuit of transformer 332, 332', while the disengagement of contact 391 by switch 390 breaks the energizing circuit for pump motor 37, cyclometer resetting solenoid 223 and presettor motor 91. Accordingly, motors 37 and 91 and transformer 332, 332' will be deenergized and the previously energized relay 342 will return to its initial position in which contact 382 is disengaged by grounded switch 383, whereupon delivery valve 44 will close in response to deenergizing of its solenoid 45.

It will be observed that upon deenergization of cyclometer resetting solenoid 223, the lever 218 (Fig. 2) will be withdrawn from beneath the projection 219 on rack 182, and since pump 39 stops simultaneously with the deenergizing of solenoid 223, the rack will return to its lowermost position in cylinder 184 under the action of weight 186. As the rack moves downwardly it rotates pinions 200 and 201, thereby resetting cyclometers 192 and 193, respectively. Also, upon downward movement of the rack, pinion 177 and disc 175 are rotated in a counterclockwise direction (Fig. 2) whereby pin 176 will strike the end 165c of contact lever 165, pushing the latter end into its initial position against contact 166 and disengaging the other end 165b from contact 167 (Figs. 9 and 11). In the event that pin 176 pushes the contact lever against contact 166 before rack 182 reaches its lowermost position, further downward movement of the rack will cause collar 178 to slip over the surface of collar 185 (Fig. 9).

In some instances the customer may desire to stop the delivery of gasoline one or more times before the total amount of gasoline purchased has been delivered. In order to stop the flow of gasoline through the delivery hose, the customer presses emergency button 341, thereby energizing solenoid 338 by a circuit traceable from the ungrounded terminal of low tension side 332' of the transformer, through wire 336, terminal 337, relay 338, terminal 333, contact 348, to the grounded button 341. Energization of relay 338 causes switch 374 to disengage contact 375, and also causes switch 386 to engage contact 387. Upon disengagement of contact 375 by switch 374, the holding circuit for relay 342 previously traced is broken, whereupon the plunger of relay 342 will cause switch 372 to disengage contact 371' and engage contact 371. Deenergization of relay 342 will also cause switch 383 to disengage contact 382 and engage contact 384, so that the energizing circuit of delivery valve solenoid 45 previously traced will be broken and the delivery valve returned to its initial closed position. The engagement of switch 386 with contact 387 establishes a holding circuit for relay 338 which is traceable from the ungrounded terminal of low tension side 332' of the transformer through wire 336, terminal 337, relay 338, terminal 333, wire 388, contact 387, switch 386, wire 363, contact 384, to the grounded switch 383. Accordingly, the relay 338 will remain energized even though emergency switch 341 is closed for only an instant. The amber light A, which is connected in parallel with relay 338, will become energized simultaneously with the energizing of relay 338 and thereby indicate to the customer that the delivery valve is closed.

When the delivery of gasoline is to be resumed, the customer presses delivery button 352 thereby reenergizing relay 342 through the circuit traceable from the ungrounded terminal of low tension side 332' of the transformer through wire 336, terminal 337, relay 342, wire 344, contact 461', switch 374, contact 466, wire 350, contact 351, to the grounded switch 352. The energized relay 342 causes switch 372 to reengage contact 371' and again establish the holding circuit for relay 342 previously traced, and also causes switch 383 to disengage contact 384, thereby breaking the holding circuit for relay 338 previously traced. Immediately upon disengagement of contact 384 by switch 383, the latter engages contact 382 thereby energizing delivery valve solenoid 45 by the circuit previously traced and causing the valve to open. Upon deenergizing of relay 338 in response to the closing of prepare switch 352, switch 386 disengages contact 387 and switch 374 engages contact 375, whereby the holding circuit for relay 342 previously traced is reestablished. The delivery valve 44 may be opened and closed in this manner as many times as desired during the delivery operation and until pin 73 falls through opening 60 in the lower disc. Each time delivery switch 352 is operated, the red light R is energized and the amber light A is deenergized, and each time the emergency switch 341 is operated amber light A is energized and red light R is deenergized. Accordingly, the customer is provided with a visible signal indicating the position of the delivery valve.

It will be apparent that presettor disc 62 should not be preset more than one revolution with respect to its cooperating disc 58. That is, if the presettor disc were advanced one revolution and a fraction of another revolution relative to the lower disc, pin 73 would fall into the opening 60 in the lower disc as soon as the opening approached pin 73 through the fraction of a revolution over and above the first complete revolution, and accordingly the first complete revolution of the presettor disc relative to the lower disc would be wasted. The switch 76' is employed to prevent this contingency. Referring to Figs. 4, 5 and 7, when the upper disc 62 has been preset substantially a complete revolution relative to the lower disc, the cam edge 78' on projection 78 engages pin 84 on the lower disc and opens contacts 76'. Upon opening of the latter contact, coin gate solenoid 252 is deenergized and the coin gate falls to its initial position over the coin slot. During the downward movement of the coin gate, contact member 256 carried by the gate engages contact 257 thereby energizing solenoid 308 by the circuit previously traced. Energization of solenoid 308 causes cross member 305 to move upwardly and tilt plates 291, 291a, etc. to the dotted line position shown in Fig. 20, whereupon the unmetered coins will be returned to the customer through return chute 313.

It will be observed by reference to Figs. 4, 5 and 7 that if the presettor disc 62 is preset only a small amount relative to the lower disc, pin 82 on the presettor disc will remain in engagement with cam 59 on the lower disc, thereby holding contacts 81' open. As long as the latter contacts are open, it is impossible for the customer to start the delivery of gasoline because the energizing circuit of relay 342 will remain open even when the customer presses delivery button 341. It is only when the presettor disc 62 has been preset a sufficient amount to carry pin 82 beyond cam 59 that contacts 81' close to permit energization of relay 342 by the delivery button. Accordingly, contacts 81' operate as a minimum sale switch for preventing the delivery of gasoline in transactions wherein the value of the coins deposited is insufficient to make the transaction profitable. Cam 59 may be of any desired length depending upon the value of the minimum sale for which the machine is to operate. In the event that a customer who has inserted coins amounting to more than the minimum value desires to stop the delivery at a time when pin 82 is over cam 59, the customer may start the delivery again by pressing delivery button 352. In this case, operation of the latter button energizes relay 342 through a circuit traceable from the ungrounded terminal of low tension side 332' of the transformer through wire 336, terminal 337, relay 342, wire 344, contact 461', switch 374, contact 466, wire 350, contact 351, to the grounded switch 352.

In the event that the machine is started by closing prepare switch 334 and is abandoned before completion of the transaction, the machine is prevented from operating indefinitely by the cut-off switch including contact lever 165 (Figs. 9 and 11). When the machine is operated continuously for a predetermined period of time, such as five minutes, presettor motor 91 advances disc 161 (Fig. 2) sufficiently for the end 165a of contact lever 165 to engage pin 176 on disc 175 and swing slowly against the action of spring 169. During the movement of the contact lever, the ends of the lever are disengaged for a substantial period of time as previously described. Accordingly, the circuit previously traced through relay 366 will be broken for a sufficient time interval to deenergize the latter relay and cause switches 361 and 390 to disengage contacts 461 and 391, respectively. Thereupon, the parts of the machine will return to their initial idle positions as previously described. In the event that the automatic cut-off switch operates before a transaction is completed, the customer may restart the machine by closing prepare switch 334 if the coin metering operation is not completed; and by closing prepare switch 334 and then delivery switch 352 if the coin metering operation is completed.

During the coin metering operation, relay 406 is energized by the circuit previously traced through solenoids 314, thereby causing switch 346 to disengage contact 345. Accordingly, it is impossible for the customer to start the delivery of gasoline during the coin metering operation because the circuit for energizing delivery relay 342 in response to the operation of delivery button 352 includes contact 345 and switch 346.

In order to permit operation of the machine by an attendant without the use of the coin controlled mechanism previously described, it is necessary only to turn the key-operated switch actuator 421 so that its projection 421' engages switch 420 and moves the latter switch out of engagement with contacts 422 and 425 and into engagement with contact 429. Thereafter, closing of the attendant switch 430 will energize relay 424 by a circuit traceable from the ungrounded terminal of low tension side 332' of the transformer through resistance 418, wire 419, switch 420, contact 429, switch 430, contact 431, wire 423, relay 424, to the grounded terminal 415. Energization of relay 424 causes switch 410 to engage contact 411 and thereby energize presettor solenoid 115 and coin cyclometer solenoid 212 through the circuit previously traced. When the attendant engages switch 430 with contact 431 for a sufficient time interval to preset the upper disc 62 the desired amount as determined by the reading of cyclometers 192 and 193, he releases attendant button 430 and operates delivery button 352 in the manner previously described.

It will be observed that the new machine is substantially fool-proof from the standpoint of both the customer and the vendor. The coin gate 251 prevents the insertion of coins by the customer before the machine has been properly prepared for a transaction by the closing of prepare switch 334. In the event that the customer presses either the delivery switch 352 or the emergency switch 341 before pressing prepare switch 334, no harmful result will occur because transformer 332, 332' which supplies the release controlled by the delivery and emergency switches is deenergized. If the preparing operations of the machine are not properly initiated upon closing of prepare switch 334, the absence of the green light G will warn the customer not to insert any coins in the event that the machine operates sufficiently for coin gate 251 to open the coin slot. When the machine is properly prepared for a transaction, the customer may insert as many coins as desired and in any denomination, and the coins which remain unmetered when the presettor disc has been advanced substantially a complete revolution will be automatically returned to the customer through the return chute 313. As previously described, the machine will not deliver gasoline in response to the insertion of coins totalling less than a desired minimum value as determined by the length of cam 59 on lower disc 54. However, if the customer inserts coins which do not total the minimum sale value, that is, which are insufficient to preset pin 73 beyond cam 59, these coins will be metered and will inure to the benefit of the next transaction. Accordingly, when the customer inserts less than the required minimum value of coins and presses delivery switch 352 without obtaining any response, he may insert additional coins to make up the required minimum value and thus obtain value for the coins first inserted. During the coin metering operation, relay 406 maintains switch 346 disengaged from contact 345, so that the machine will not respond to closing of delivery switch 352. In the event that the customer closes delivery switch 352 at a time when none of the coin metering circuits is energized although one or more coins remain to be metered, the red light R will be energized indicating that the delivery operation is in process, and at the same time solenoid 309 will tilt the coin plates 291 and return the unmetered coins to the customer. It will be apparent that by reason of the green, red and amber lights the customer is always appraised of the operation of the machine which is in progress at any time.

The coin metering drum 156 and distributor 452 may be operated at high speed so that the coin metering operation will be completed in a relatively short time. I have found that the coin metering drum and distributor may be operated at sufficiently high speeds to meter the purchase price of 20 gallons of gasoline at current prices in one or two minutes. It is to be noted that the coin metering drum 156 and clutches 101, 102 and 206, 207 for driving the presettor disc and coin cyclometer, respectively, are all driven by presettor motor 91. Accordingly, if the speed of the presettor motor should vary during the coin metering operation, the variation in speed will not affect the accuracy of the metering mechanism. That is, if the speed of the presettor motor decreases the metering circuits will remain energized for longer periods of time by reason of the slower speed of coin metering drum 156, but these longer periods of time will be compensated for by the correspondingly lower speeds of the driven members of clutches 101, 102 and 206, 207. Conversely, an increase in the speed of presettor motor 91 will shorten the time intervals during which the coin metering circuits remain energized, and will correspondingly increase the speeds of the driven members of clutches 101, 102 and 206, 207. Therefore, in either case the amount of advance of presettor disc 62 will be the same for a given value of coins. It will be understood that since gallon cyclometer 192 is driven by the same clutch 101, 102 that drives the presettor disc, the reading of the latter cyclometer will not be affected by variations in the speed of presettor motor 91 because such variations will be compensated for in the manner described in connection with the presettor disc.

It is to be understood that while I have described and illustrated in detail only one form of my new machine, the invention is not limited thereto but is susceptible to various modifications within its scope. For example, delivery button 352 and emergency stop button 341 may be dispensed with by employing in addition to the electrically controlled delivery valve 44 a manually operated valve at the end of delivery hose 43 for permitting the customer to control the flow of gasoline which he purchases. Also, if desired, the delivery and emergency stop buttons and their respective indicating lights may be arranged on a small panel near the end of the hose, instead of on the pump panel, so that the customer may more easily view the discharge from the hose nozzle while operating the buttons.

I claim:

1. A dispensing machine which comprises delivery means, a meter operable by the delivery means for measuring the amount of delivery, a circuit for controlling the delivery means, normally open switching means in said circuit, control mechanism for said switching means including a member operatively connected to the meter and movable continuously thereby through a distance proportional to the amount of the delivery in response to the operation of the delivery means, and a second member disposed in cooperative relation with the first member and movable relative thereto, said members being normally in initial relative positions, means for advancing the second member relative to the first member, means for closing said switching means when said second member is in an advanced position relative to the first member, and means for opening the switching means when said members assume their initial relative positions.

2. A dispensing machine which comprises delivery means, a circuit for controlling the delivery means, normally open switching means in said circuit, control mechanism for said switching means including a member movable through a distance proportional to the amount of the delivery in response to the operation of the delivery means, a second member disposed in cooperative relation with the first member and movable relative thereto, said members being normally in initial relative positions, and a pin on one of said members adapted to be received in an opening in the other member when the members are in their initial relative positions, means for removing the pin from said opening and advancing the second member relative to the first member, and an operative connection between the pin and said switching means for closing the switching means when the pin is removed from said opening and opening the switching means when the pin is received in said opening.

3. A dispensing machine which comprises normally inoperative delivery means, control mechanism for the delivery means including a member movable through a distance proportional to the amount of the delivery in response to operation of the delivery means, and a second member disposed in cooperative relation with the first member and movable relative thereto, said members being normally in initial relative positions, driving means, a variable speed transmission connected to said driving means, a normally disengaged clutch connected to the variable speed transmission and operatively connected to the second member for advancing the second member relative to the first member, coin controlled means for operating said clutch, means for rendering the delivery means operative when said second member is in an advanced position relative to the first member, and means for rendering the delivery means inoperative when said members assume their initial relative positions.

4. A dispensing machine which comprises a fluid delivery means, a device for metering the fluid delivered by said means, control mechanism for the delivery means including a member movable by the metering device in accordance with the amount of delivery, a second member co-acting with the first member and movable independently thereof, means for rendering the delivery means inoperative when said second member is in initial position relative to the first member and for rendering the delivery means operative when the second member is advanced from said initial position, means for advancing the second member from said initial position an amount commensurate with the amount of fluid to be delivered including a variable speed transmission and a driving connection between the transmission and said second member, and a counting device driven from said driving connection for indicating the amount of fluid to be delivered in accordance with said advance of the second member.

5. A dispensing machine which comprises delivery means, control mechanism for the delivery means including a movable member for determining the amount of delivery in accordance with the distance traversed by the member, driving means, a variable speed transmission connected to the driving means, a clutch driven by said transmission, a driving connection between the clutch and said member, a counting device operated by said driving connection, a second clutch driven by said driving means independently of said transmission, a second counting device operatively connected to the second clutch, and coin controlled means for operating said clutches, one of said counting devices being operable to register the amount of delivery as determined by said control mechanism, and the other counting device being operable to register the price of said amount.

6. A dispensing machine which comprises delivery means, control mechanism for the delivery means including a movable member for determining the amount of delivery in accordance with the distance traversed by the member, driving means, a variable speed transmission connected to the driving means, a clutch driven by said transmission, a driving connection between the clutch and said member, a counting device operated by said driving connection, a second clutch driven by said driving means independently of said transmission, a second counting device operatively connected to the second clutch, electromagnetic means for operating said clutches, a circuit for energizing said electromagnetic means, and coin actuated means for controlling said circuit, one of said counting devices being operable to register the amount of delivery as determined by said control mechanism, and the other counting device being operable to register the price of said amount.

7. In a fluid dispensing machine, the combination of a pump, means for driving the pump, means for starting said driving means, timing mechanism for rendering the driving means inoperative after a time interval measured from the operation from said starting means, and a piston operated by the pump for setting the timing mechanism to predetermine said interval.

8. A fluid dispensing machine which comprises normally inoperative delivery means, coin actuated means for rendering the delivery means operable to deliver a predetermined quantity of fluid commensurate with the value of the coin, an automatic cut-off mechanism for rendering the delivery means inoperative after a predetermined time interval measured from the starting thereof, and means for restarting said delivery means independently of said coin actuated means to complete delivery of said predetermined quantity after operation of the cut-off mechanism.

9. A fluid dispensing machine which comprises delivery means, means for controlling the amount of delivery, and an automatic cut-off mechanism independent of said last means for rendering said delivery means inoperative after a predetermined time interval measured from the starting thereof, said mechanism including a rotatable member, a second member cooperating with the first member and rotatable relative thereto, means for advancing the second member through a predetermined angle from an initial position relative to the first member in response to starting of the delivery means, means for rotating the first member in the direction of rotation of the second member during operation of the delivery means, and means under control of the first member for rendering the delivery means inoperative when said first member is in its initial position relative to the second member.

10. A fluid dispensing machine which comprises delivery means, coin actuated means for rendering the delivery means operable to deliver a predetermined quantity of fluid commensurate with the value of the coin, means for rendering the delivery means inoperative upon delivery of said predetermined quantity, and an automatic cut-off mechanism independent of said last means for rendering the delivery means inoperative after a predetermined time interval measured from the starting thereof, said cut-off mechanism including a rotatable member, a second member cooperating with the first member and rotatable relative thereto, means for advancing the second member through a predetermined angle from an initial position relative to the first member in response to starting of the delivery means, means for rotating the first member in the direction of rotation of the second member during operation of the delivery means, means under control of the first member for rendering the delivery means inoperative when said first member is in its initial position relative to the second member, and mechanism for moving said members to their initial relative positions upon delivery of said predetermined quantity of fluid before operation of said last means.

11. In a dispensing machine, normally inoperative delivery means including a member movable through a distance proportional to the amount of the delivery and a second member disposed in cooperative relation with the first member and movable relative thereto, said members being normally in initial relative positions, coin receiving means, mechanism controlled by coins received by said last means for advancing the second member relative to the first member an amount commensurate with the value of the coins received, means for rendering the delivery means operative when the second member is advanced relative to the first member, and means under control of the second member for rendering the coin receiving means inoperative.

12. In a dispensing machine, normally inoperative delivery means, control mechanism for the delivery means including a member movable thereby through a distance proportional to the amount of the delivery, a second member coacting with the first member and movable relative thereto, said members being normally in initial relative positions, and an element on one of said members adapted to assume a locking relation with the other member when the members are in their initial relative positions, means for removing the element from said locking relation, coin receiving means including a slot, mechanism controlled by coins inserted in said slot for advancing the second member relative to the first member an amount commensurate with the value of the coins received, means for rendering the delivery means operative when the second member is advanced relative to the first member, a gate cooperating with said slot, and means under control of said element for causing the gate to move to a position for closing the slot during operation of the delivery means.

13. In a vending machine, the combination of delivery means, coin receiving means, mechanism actuated by coins received by said last means for preparing the delivery means to deliver a quantity commensurate with the value of the coins received, and means for rejecting coins received by said coin receiving means when the delivery means is prepared to deliver a predetermined quantity.

14. In a vending machine, the combination of delivery means, coin receiving means, means for metering the coins received by said last means, mechanism operatively connected to the delivery means and controlled by said metering means to prepare the delivery means to deliver a quantity commensurate with the value of the coins received, mechanism for rendering the coin receiving means inoperative to receive coins during operation of the delivery means, and means operable in response to operation of said last mechanism to return to the customer the unmetered coins in the coin receiving means.

15. In a vending machine, the combination of delivery means, a coin storage chute, means for successively metering coins in said chute, mechanism operatively connected to the delivery means and controlled by said metering means for preparing the delivery means to deliver a quantity commensurate with the value of the coins, and means under control of said second means for returning to the customer the unmetered coins in said chute.

16. A vending machine which comprises normally inoperative delivery means, driving means, a member movable by said driving means for rendering the delivery means operative to deliver an amount commensurate with the distance travelled by said member, coin receiving means, a timing device driven by the driving means, and means operable by a coin deposited in said receiving means and controlled by said timing device for causing the driving means to drive said member for an interval commensurate with the value of the coin.

17. A vending machine which comprises normally inoperative delivery means, driving means, a normally disengaged clutch connected to the driving means, means driven by said clutch for rendering the delivery means operative to deliver an amount commensurate with the amount of rotation of the driven member of the clutch, coin receiving means, a timing device driven by the driving means, and means operable by a coin deposited in said receiving means and controlled by the timing device for engaging the clutch for intervals commensurate with the value of the coin received by said receiving means.

18. A vending machine which comprises normally inoperative delivery means, mechanism for rendering the delivery means operative, a plurality of circuits for individually operating said mechanism, coin actuated means individual to each circuit and operable by a coin of a predetermined denomination to control the circuit and render the delivery means operative to deliver an amount commensurate with the value of the coin, and means under control of one of said coin actuated means for rendering the other coin actuated means inoperative.

19. A vending machine which comprises normally inoperative delivery means, driving means, a normally disengaged clutch connected to the driving means, means driven by said clutch for rendering the delivery means operative to deliver an amount commensurate with the amount of rotation of the driven member of the clutch, means for receiving coins of different denominations, a circuit individual to each coin denomination, a pair of normally open contacts in each circuit, a timing device driven by said driving means for successively closing said contacts, a distributor connected in said circuits and having a distributor point individual to each circuit, means for driving the distributor to successively engage the distributor points, means responsive to closing of each circuit for engaging said clutch, and means controlled by said timing device and operable in response to closing of each circuit for maintaining the circuit closed while said driven clutch member is rotated an amount commensurate with the value of the coin corresponding to the circuit.

20. A vending machine comprising normally inoperative delivery means, coin receiving means, coin controlled means for rendering the delivery means operable to deliver a quantity commensurate with the value of the coins received by said receiving means, said coin controlled means being normally in an inoperative condition, means for causing the coin controlled means to assume an operative condition responsive to coins received by said receiving means, and signal means for indicating the condition of the coin controlled means.

21. A vending machine which comprises normally inoperative delivery means, coin receiving means, coin controlled means for preparing the delivery means to deliver a quantity commensurate with the value of the coins received by said receiving means, means for operating the delivery means after operation of said coin controlled means, manually operable means for selectively rendering the delivery means operative and inoperative until completion of the delivery of said quantity, and signal means for indicating the condition of the delivery means prior to completion of said delivery.

22. A vending machine which comprises delivery means, a member movable in response to operation of the delivery means for measuring the amount of delivery, a member cooperating with said first member and movable relative thereto for controlling the amount of delivery, said members normally occupying initial relative positions, means for rendering the delivery means inoperative when the members are in said initial relative positions, coin receiving means, means for advancing the second member relative to the first member through a distance proportional to the value of coins received by said receiving means, and means for maintaining the delivery means inoperative when coins of less than a predetermined aggregate value are deposited in the receiving means.

23. A vending machine which comprises delivery means, coin metering means for rendering the delivery means operable to deliver a quantity commensurate with the value of the coins metered, means for initiating operation of the delivery means, and means for rendering the initiating means inoperative during operation of said metering means.

24. A fluid dispensing machine comprising normally inoperative delivery means, a meter for measuring the amount of delivery, a member connected to the meter and movable therewith, a member movable relative to the last member for controlling the amount of delivery, said members being normally in initial relative positions, means independent of the meter for advancing the second member from its initial position an amount commensurate with the amount of fluid to be delivered, means for rendering the delivery means operable when the second member is advanced relative to the first member, mechanism for rendering the delivery means inoperative when said first member returns to its initial position relative to the second member, and indicating means operated by said independent means for indicating the cost of fluid to be delivered in accordance with the advance of said second member by said independent means.

25. A fluid dispensing machine comprising normally inoperative delivery means, a meter for measuring the amount of delivery, a member connected to the meter and movable therewith, a member movable relative to the last member for controlling the amount of delivery, said members being normally in initial relative positions, a motor, means for selectively connecting and disconnecting the motor and said second member to advance the second member from its initial position an amount commensurate with the amount of fluid to be delivered, means for rendering the delivery means operable when the second member is advanced relative to the first member, mechanism for rendering the delivery means inoperative when said first member returns to its initial position relative to the second member, and indicating means operated by the motor and movable thereby with said second member to indicate the cost of fluid to be delivered in accordance with the advance of the second member by the motor.

26. A fluid dispensing machine comprising normally inoperative delivery means, a meter for measuring the amount of delivery, a member connected to the meter and movable therewith, a member movable relative to the last member for controlling the amount of delivery, said members being normally in initial relative positions, a motor, cost and volume indicating means, driving connections between the motor and the respective indicating means, a branch connection to said second member from one of said last connections for advancing the second member from its initial position an amount commensurate with the amount of fluid to be delivered, said indicating means being operable to indicate the amount and the cost of the fluid to be delivered in accordance with the advance of said second member by the motor, and means for rendering the delivery means operable when the second member is advanced relative to the first member.

27. A dispensing machine comprising normally inoperative delivery means, control mechanism for the delivery means including a member movable thereby through a distance proportional to the amount of delivery and a second member coacting with the first member and movable relative thereto, said members being normally in initial relative positions, a pin on one of said members adapted to be received in an opening in the other member when the members are in their initial relative positions, means for removing the pin from said opening and holding it in a retracted position, coin receiving means, mechanism controlled by coins received by said last means for advancing the second member from its initial position an amount commensurate with the value of the coins received, means for initiating operation of the delivery means when the second member is advanced relative to the first member, means under control of said last means for releasing the pin, and means under control of the pin for rendering the coin receiving means inoperative when the pin is released.

28. A fluid dispensing machine comprising delivery means, means for controlling the amount of delivery including a pair of relatively movable members and a pin carried by one of the members and normally disposed in an opening in the other, means for rendering the delivery means inoperative when the pin is in said opening, actuating means for withdrawing the pin from the opening and maintaining it in a retracted position, mechanism for advancing one of the members relative to the other through a distance commensurate with the amount to be delivered, a device operated by the delivery means for moving the other member, and an automatic cut-off mechanism including means for releasing the pin after a predetermined time interval measured from the operation of said actuating means.

29. A fluid dispensing machine comprising a pump, means for rendering the pump operable to deliver a predetermined quantity of fluid, means for rendering the pump inoperative upon delivery of said quantity, and an automatic cut-off mechanism for rendering the pump inoperative after a predetermined time interval measured from the starting thereof, said cut-off mechanism including a pair of members normally occupying fixed relative positions, means operable by the pump for advancing one of the members relative to the other, means for moving the second member toward its initial position relative to the first member during operation of the pump, and means under control of said members for stopping the pump when the second member is returned substantially to said initial position relative to the first member.

30. A fluid dispensing machine comprising a fluid delivery means, a device for metering the fluid delivered by said means, mechanism for controlling the amount of fluid delivered by said means including a pair of relatively movable members, one of which is operatively connected to the metering device, means for advancing the other member from an initial position relative to the first member, means for rendering the delivery means operable when the second member is in an advanced position relative to the first member, and means for indicating the advance of the second member from said initial position in terms of the price of the fluid to be delivered.

31. A fluid dispensing machine comprising normally inoperative delivery means, a device for metering the fluid delivered by said means, mechanism for controlling the amount of fluid delivered by said means including a pair of relatively movable control members normally assuming initial relative positions, actuating means for advancing one of said members from its initial position relative to the other, means for rendering the delivery means operable when said first member is in an advanced position relative to the other member, means operable by the metering device for moving said members relatively back to their initial relative positions to render the delivery means inoperative, a counting device operable by the actuating means, and adjustable means for varying the operating ratio between the actuating means and the control member actuated thereby and the actuating means and the counting device, whereby the advance of said actuated control member is indicated by the counting device in accordance with the setting of the adjustable means.

LUCIEN O. YEOMANS.